US012762980B2

(12) United States Patent
Lee et al.

(10) Patent No.: US 12,762,980 B2
(45) Date of Patent: Oct. 13, 2026

(54) DISPLAY DEVICE AND METHOD OF DRIVING THE SAME

(71) Applicant: SAMSUNG ELECTRONICS CO., LTD., Suwon-si (KR)

(72) Inventors: Hajun Lee, Suwon-si (KR); Mi-Ri Park, Suwon-si (KR); Junhyuk Yang, Suwon-si (KR); Seungmin Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/779,983

(22) Filed: Jul. 22, 2024

(65) Prior Publication Data

US 2025/0104583 A1 Mar. 27, 2025

(30) Foreign Application Priority Data

Sep. 21, 2023 (KR) ........................ 10-2023-0126568

(51) Int. Cl.

*G09G 3/3233* (2016.01)
*G09G 3/00* (2006.01)
*G09G 3/20* (2006.01)
*G09G 3/3275* (2016.01)

(52) U.S. Cl.

CPC ........... *G09G 3/006* (2013.01); *G09G 3/2096* (2013.01); *G09G 3/3233* (2013.01); *G09G 3/3275* (2013.01); *G09G 2300/0819* (2013.01); *G09G 2300/0842* (2013.01); *G09G 2310/027* (2013.01); *G09G 2310/0291* (2013.01); *G09G 2320/045* (2013.01); *G09G 2330/12* (2013.01)

(58) Field of Classification Search

CPC ... G09G 2300/0819; G09G 2300/0842; G09G 2310/027; G09G 2310/0291; G09G 2320/045; G09G 2330/12; G09G 3/006; G09G 3/2096; G09G 3/3233; G09G 3/3275

See application file for complete search history.

(56) References Cited

U.S. PATENT DOCUMENTS

| | | | |
|---|---|---|---|
| 9,412,308 | B2 | 8/2016 | Min et al. |
| 9,530,356 | B2 | 12/2016 | Min et al. |
| 10,290,263 | B2 | 5/2019 | Hwang |
| 11,276,346 | B2 | 3/2022 | Lin et al. |
| 11,605,339 | B2 | 3/2023 | Kim et al. |
| 11,610,540 | B2 | 3/2023 | Piao et al. |
| 11,620,946 | B1 | 4/2023 | Akyol et al. |

(Continued)

FOREIGN PATENT DOCUMENTS

| | | |
|---|---|---|
| KR | 10-2071296 | 3/2020 |
| TW | 202001537 A | 1/2020 |

*Primary Examiner* — Nitin Patel
*Assistant Examiner* — Amen W Bogale
(74) *Attorney, Agent, or Firm* — Fish & Richardson P.C.

(57) ABSTRACT

A display device including a plurality of channels including at least one dummy channel; a plurality of first sampling circuits sampling a plurality of dummy voltages corresponding to each of the at least one dummy channel; and a holding/scaling circuit including a first input node, a second input node, a first output node, a second output node, a first feedback capacitor connected between the first input node and the first output node, and a second feedback capacitor connected between the second input node and the second output node.

20 Claims, 12 Drawing Sheets

(56) References Cited

U.S. PATENT DOCUMENTS

| | | | | |
|---|---|---|---|---|
| 2013/0313621 | A1 | 11/2013 | Yamada et al. | |
| 2019/0384444 | A1 | 12/2019 | Wingard | |
| 2020/0193913 | A1* | 6/2020 | Lee ...................... | G09G 3/3266 |
| 2021/0193056 | A1* | 6/2021 | Piao ..................... | G09G 3/3291 |

* cited by examiner

303

DISPLAY DEVICE AND METHOD OF DRIVING THE SAME

CROSS-REFERENCE TO RELATED APPLICATION

This application claims priority to Korean Patent Application No. 10-2023-0126568, filed in the Korean Intellectual Property Office on Sep. 21, 2023, the disclosure of which is incorporated herein by reference herein in its entirety.

BACKGROUND

A display device may include a display panel displaying an image and a display driving circuit driving the display panel. The display driving circuit may drive the display panel by receiving image data from the outside and applying an image signal corresponding to the received image data to a data line of the display panel. Recently, an organic light emitting diode (OLED) display panel has been increasingly used in which each of a plurality of pixels of a pixel array is equipped with an OLED. The OLED display panel has an electrical feature, such as the threshold voltage or mobility of a driving transistor, disposed in the pixel may be non-uniform between the pixels, or the electrical feature may be changed due to pixel deterioration. Accordingly, a quality of the image displayed on the OLED display panel may be lower.

SUMMARY

In general, in some aspects, the present disclosure is directed toward a display device and system having accurately sensed output of an active channel.

According to some aspects of the present disclosure, a display device includes: a plurality of channels including at least one dummy channel; a plurality of first sampling circuits sampling a plurality of dummy voltages corresponding to each of the at least one dummy channel; and a holding/scaling circuit including a first input node, a second input node, a first output node, a second output node, a first feedback capacitor connected between the first input node and the first output node, and a second feedback capacitor connected between the second input node and the second output node, the holding/scaling circuit configured to store voltages of substantially the same magnitude in the first and second feedback capacitors, receive the plurality of sampled dummy voltages from the first input node and the second input node, and output a plurality of dummy output voltages acquired by amplifying the plurality of sampled dummy voltages to the first output node and the second output node.

According to some aspects of the present disclosure, a display device includes: a first input node and a second input node; a first output node and a second output node; a first feedback capacitor connected between the first input node and the first output node; a second feedback capacitor connected between the second input node and the second output node; a differential amplifier including a first input terminal, a second input terminal, a first output terminal connected to the first output node, and a second output terminal connected to the second output node; a plurality of offset capacitors respectively connected to the first input terminal and the second input terminal, and respectively storing offset voltages of the first input terminal and the second input terminal; a first switch having one end connected to the first output node and the other end connected to the first feedback capacitor; a second switch having one end connected to the second output node and the other end connected to the second feedback capacitor; a third switch having one end connected to the other end of the first switch and the other end connected to the input terminal through which a predetermined first voltage is input; a fourth switch having one end connected to the other end of the second switch and the other end connected to the input terminal through which the predetermined first voltage is input; a fifth switch having one end connected to the other end of the first switch and the other end connected to the input terminal through which a first reference voltage is input; and a sixth switch having one end connected to the other end of the second switch and the other end connected to the input terminal through which a second reference voltage different from the first reference voltage is input.

According to some aspects of the present disclosure, a display system includes: a display panel including a plurality of gate lines, a plurality of data lines, a plurality of sensing lines including at least one dummy channel, and a plurality of pixels; a host processor configured to generate image data to be displayed on the display panel and transmit the image data to a timing controller; a data driver including a first input node, a second input node, a first output node, a second output node, a first feedback capacitor connected between the first input node and the first output node, and a second feedback capacitor connected between the second input node and the second output node, the data driver configured to store voltages of substantially the same magnitude in the first and second feedback capacitors, sample each of a plurality of dummy voltages corresponding to the at least one dummy channel, receive the plurality of sampled dummy voltages from the first input node and the second input node, output a plurality of dummy output voltages acquired by amplifying the plurality of sampled dummy voltages to the first output node and the second output node, and receive the plurality of dummy output voltages and a plurality of active output voltages to generate a data sensing signal indicating each electrical feature of the plurality of pixels; and the timing controller configured to receive image data, compensate for the image data based on the data sensing signal, and generate the compensated image data.

DETAILED DESCRIPTION

Hereinafter, example implementations will be described in detail with reference to the accompanying drawings.

Figure 1:
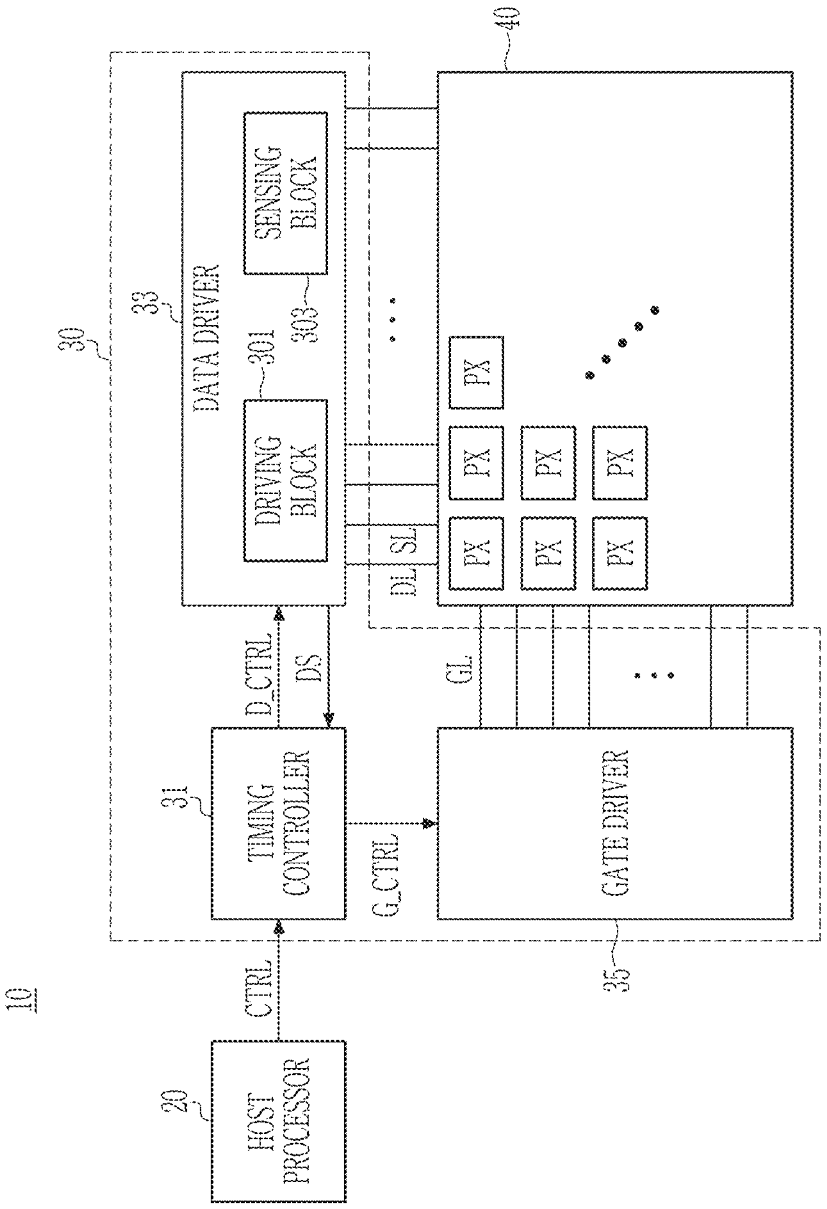
FIG. 1 is a block diagram showing an example of a display system according to some implementations.

FIG. 1 is a block diagram showing an example of a display system 10 according to some implementations. In some implementations, the display system 10 may be mounted on an electronic device having an image display function. For example, the electronic device may include a smartphone, a tablet personal computer, a portable multimedia player (PMP), a camera, a wearable device, a television, a digital video disk (DVD) player, a refrigerator, an air conditioner, an air purifier, a set-top box, various medical devices, a navigation device, a global positioning system (GPS) receiver, a vehicle device, furniture, various measuring devices, or the like.

In FIG. 1, the display system 10 may include a host processor 20, a display driving circuit 30, and a display panel 40. In addition, the display driving circuit 30 may include a timing controller 31, a data driver 33, and a gate driver 35. The display driving circuit 30 and the display panel 40 may be implemented as one module, and may be referred to as a display device.

The host processor 20 may entirely control the display system 10. The host processor 20 may generate image data to be displayed on the display panel 40, and transmit the image data and a control command to the display driving circuit 30. The host processor 20 may be a graphics processor. However, in some implementations, and the host processor 20 may be implemented as any of various types of processors, such as a central processing unit (CPU), a microprocessor, a multimedia processor, or an application processor. In some implementations, the host processor 20 may be implemented as an integrated circuit (IC) or a system on chip (SoC).

The timing controller 31 may control driving timings of the data driver 33 and the gate driver 35 based on the control command received from the host processor 20. The timing controller 31 may perform various image processing on the image data received from the host processor 20 to change a format of the image data, reduce power consumption, or the like.

The timing controller 31 may transmit a data control signal D_CTRL to the data driver 33. The data control signal D_CTRL may include a clock signal and the image data. The timing controller 31 may transmit a gate control signal G_CTRL to the gate driver 35.

In addition, the timing controller 31 may receive a data sensing signal DS from the data driver 33. The data sensing signal DS may be a signal indicating each electrical feature of a pixel PX or the plurality of pixels PXs disposed on the display panel 40.

In addition, the timing controller 31 may perform data compensation, such as external compensation, for the image data, and provide the compensated image data to the data driver 33. The timing controller 31 may calculate a compensation value to compensate for a deviation between the electrical features of the pixels PXs or a change in the electrical feature due to its deterioration based on the received data sensing signal DS. For example, the electrical feature may include a threshold voltage of the driving transistor disposed in the pixel PX, mobility of the driving transistor, a threshold voltage of a light emitting device, or the like. The timing controller 31 may store the calculated compensation value in a memory. The compensation value stored in the memory may be updated whenever performing a sensing operation of the electrical feature of the pixel PX. The timing controller 31 may perform the data compensation for the image data based on the compensation value.

The data driver 33 may process the image data based on the data control signal D_CTRL received from the timing controller 31, and generate the data sensing signal DS. The data sensing signal DS may be a signal indicating each electrical feature of the plurality of pixels PXs. For example, the data driver 33 may process the image data in synchronization with the clock signal received from the timing controller 31. The data driver 33 may drive the plurality of pixels PXs through a plurality of data lines DLs and measure electrical features of the plurality of pixels PXs through sensing lines SLs.

In some implementations, the data driver 33 may include a driving block 301 and a sensing block 303. The driving block 301 may digital-analog convert the received image data and provide the analog-converted data signal to the display panel 40 through the plurality of data lines DLs. Each of the data signals may be provided to each of the plurality of pixels PXs. The driving block 301 may convert the image data provided from the timing controller 31 in a display mode into a data signal, such as a data voltage, and output the data voltage to the display panel 40 through the data line DL. The driving block 301 may convert a sensing data internally set in a sensing mode into the data signal and output the data signal to the display panel 40 through the data line DL. In some implementations, the driving block 301 may include a plurality of digital-to-analog converters DACs, and each of the plurality of DACs may convert the input image data into the data voltage.

The sensing block 303 may receive the sensing signal through the sensing line SL from the display panel 40 operated in response to the data signal. The sensing block 303 may then transmit the received sensing signal to the timing controller 31 as the data sensing signal DS.

The sensing block 303 may measure the electrical features of the plurality of pixels PXs periodically or aperiodically in the sensing mode. In some implementations, the sensing mode may be set in a manufacturing stage of the display device, a boot period after the display system 10 is powered on, an end period when the display system 10 is powered off, or a dummy period (or vertical blanking period) between frame display periods of the display panel 40. In some implementations, the sensing mode may be performed in a state where only a screen of the display device is turned off while power is being applied to the display system 10, for example, in a standby mode, a sleep mode, a low power mode, or the like. The timing controller 31 may detect the standby mode, the sleep mode, the low power mode, or the like based on a predetermined control process, and control overall operations for the sensing mode.

The sensing block 303 may receive the sensing signals indicating the respective electrical features of the plurality of pixels PXs through the plurality of sensing lines SL, and generate a sensing value by analog-to-digital converting the sensing signal. The sensing signal may include the pixel voltage or pixel current of the pixel PX corresponding to the image data when the display driving circuit 30 is operated in the display mode, and include a sensing current when the display driving circuit 30 is operated in the sensing mode. The sensing current may be a sensing current of the pixel PX that corresponds to sensing data or a current based on a voltage generated in the sensing block 303.

The sensing block 303 may simultaneously sample the plurality of sensing signals received through the plurality of sensing lines SL, and sequentially analog-digital convert the sampled sensing values. The sensing block 303 may be equipped with a plurality of sampling circuits for simultaneously sampling the plurality of sensing signals and a holding/scaling circuit for scaling and holding the sampled signal. The sensing block 303 may include one or more analog to digital converters (ADCs) for analog-to-digital conversion of the plurality of sampled sensing signals. In some implementations, the ADC may be implemented as a pipeline analog to digital converter (ADC). The pipeline ADC may share a current sensing scheme through parallel sensing and series amplification processes, thus minimizing a sensing error and maximizing a sensing capability. In some implementations, the ADC may be operated based on the clock signal in the data control signal D_CTRL.

The gate driver 35 may drive a plurality of gate lines GL of the display panel 40 based on the gate control signal G_CTRL received from the timing controller 31. The gate driver 35 may provide a gate-on voltage pulse to the corresponding gate line GL during a corresponding drive period for each of the plurality of gate lines GL based on the gate control signal G_CTRL. For example, a gate-on voltage may be a scan voltage or a sense-on voltage. The gate driver 35 may output a gate drive signal G_CTRL to the display panel 40 through the gate line GL.

The display panel 40 may include the plurality of signal lines, such as the plurality of gate lines GL, the plurality of data lines DLs, or the plurality of sensing lines SL, and the plurality of pixels PXs connected to the plurality of signal lines and arranged in a matrix form. The display panel 40 may display an image based on the data signal received from the data driver 33 or the gate drive signal received from the gate driver 35. In some implementations, the display panel 40 may include a pixel implemented using an organic light emitting diode (OLED) cell. Accordingly, the OLED cell may receive the data signal of the data line DL and the gate drive signal of the gate line GL, and may perform an operation of displaying the image in response to the operation of the organic light emitting diode OLED. However, in some implementations, the display panel 40 may be implemented as another type of flat display or flexible display panel.

In some implementations, the pixel PX may have a red-green-blue (RGB) structure. However, in some implementations, the pixel PX may have an RGBW structure further including a white (W) sub-pixel for its luminance improvement. In some implementations, the pixel PX may be implemented as a combination of sub-pixels of different colors.

Figure 2:
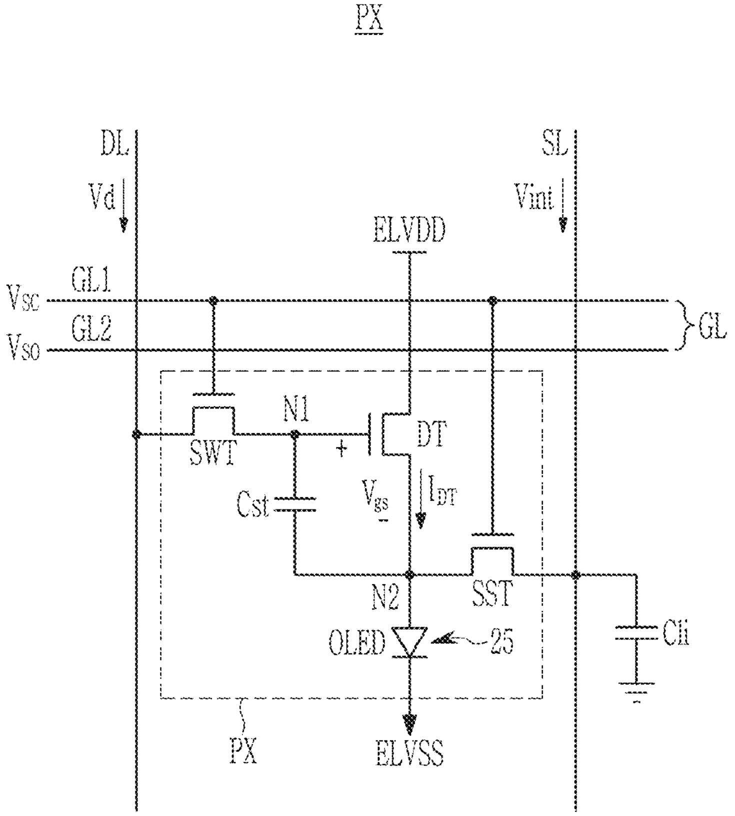
FIG. 2 is a circuit diagram of an example of a pixel according to some implementations.

FIG. 2 is a circuit diagram of an example of a pixel according to some implementations. In FIG. 2, the pixel PX may include a switching transistor SWT, a driving transistor DT, an OLED 25, a storage capacitor Cst, and a sensing transistor SST. In some implementations, the pixel PX may have various structures.

A first driving voltage ELVDD and a second driving voltage ELVSS may be applied to the pixel PX. The first driving voltage ELVDD may be relatively higher than the second driving voltage ELVSS.

The switching transistor SWT, the sensing transistor SST, or the driving transistor DT may be formed as an amorphous silicon (a-Si) thin film transistor (TFT), a poly-silicon (poly-Si) TFT, an oxide TFT, or an organic TFT, or the like.

The gate line GL connected to the pixel PX may include a first gate line GL1 and a second gate line GL2.

The switching transistor SWT may be connected to the first gate line GL1 and the data line DL. The switching transistor SWT may be turned on in response to a scan voltage Vsc applied through the first gate line GL1. The turned-on switching transistor SWT may provide the data signal supplied through the data line DL, for example, a data voltage Vd, to a gate node N1 of the driving transistor DT. The data voltage Vd may be generated by the digital-to-analog converter DAC of the data driver 33. The plurality of digital-to-analog converters DACs for generating the data voltages provided to the plurality of data lines DLs (of FIG. 1) may be disposed in the driving block 301.

The sensing transistor SST may be connected to the second gate line GL2 and the sensing line SL, and may be turned on by a sense-on voltage Vso applied through the second gate line GL2. The sensing transistor SST may be turned on when operated in the sensing mode. The sensing transistor SST may output the current from the driving transistor DT or the OLED 25 through the sensing line SL when operated in the sensing mode.

The storage capacitor Cst may store a difference between the data voltage Vd applied to the gate node N1 of the driving transistor DT through the switching transistor SWT and an initialization voltage Vint supplied to a source node N2 of the driving transistor DT through the sensing transistor SST, thereby supplying a constant driving voltage Vgs to the driving transistor DT for a predetermined period, for example, one frame.

The first driving voltage ELVDD may be applied to a drain node of the driving transistor DT, and the driving transistor DT may supply a driving current IDT proportional to the driving voltage Vgs to the OLED 25.

The OLED 25 may include an anode connected to the source node N2 of the driving transistor DT, a cathode to which the second driving voltage ELVSS is applied, and an organic light emitting layer between the cathode and the anode. The cathode may be a common electrode shared by the plurality of pixels PXs. The organic light emitting layer of OLED 25 may emit light when receiving the driving current IDT from the driving transistor DT. An intensity of light may be proportional to the driving current IDT. The driving current IDT may be expressed as Equation 1:

$$I_{DT} = \beta(Vgs - Vth)2 = \beta(Vd - Vint - Vth)2 \quad \text{[Equation 1]}$$

Here, β indicates a constant value determined by the mobility of the driving transistor DT, and Vth indicates the threshold voltage of the driving transistor DT.

In the display mode, the switching transistor SWT may supply the data voltage Vd applied through the data line DL to the driving transistor DT. Here, the sensing transistor SST may be turned on. The difference between the voltage at the gate node N1 of the driving transistor DT and the voltage at the source node N2 of the driving transistor DT, that is, the current IDT proportional to the driving voltage Vgs, may flow to the OLED 25. The OLED 25 may output light based on the driving current IDT corresponding to the image data.

The electrical feature of the pixel PX may be measured in the sensing mode. The switching transistor SWT may supply the sensing data voltage Vd applied through the data line DL to the driving transistor DT. The sensing transistor SST may be turned on, and the difference between the voltage at the gate node N1 of the driving transistor DT and the voltage at the source node N2 of the driving transistor DT, that is, the current $I_{DT}$ proportional to the driving voltage Vgs, may flow to the sensing line SL, thus charging a parasitic capacitor of the sensing line SL, that is, and a line capacitor Cli.

In some implementations, the ADC may measure the voltage on the sensing line SL at a time point when the voltage at the source node N2 of the driving transistor DT reaches saturation or at a time point when the voltage at the source node N2 is linearly increased. The sensing signal, that is, a pixel voltage $V_{ps}$ measured at the time point when the voltage at the source node N2 reaches the saturation, may include information on the threshold voltage Vth of the driving transistor DT, and the pixel voltage $V_{ps}$ measured at the time point when the voltage at the source node N2 is linearly increased may include information on the mobility of the driving transistor DT. For example, when the threshold voltage Vth of the pixel PX is increased, an amount of light output from the OLED 25 may be reduced as the driving current IDT is reduced even when the same data voltage Vd is provided to the pixel PX.

The timing controller 31 (in FIG. 1) may detect increase in the threshold voltage Vth of the driving transistor DT by measuring the electrical feature of the pixel PX through the sensing block 303 in order to compensate for the increase in the threshold voltage Vth of the pixel PX, and compensate for an image data value based on the detected increase. The driving block 301 (in FIG. 1) may generate the increased data signal, that is, the increased data voltage Vd, based on the image data value adjusted by the timing controller 31. Accordingly, reduction in the drive current IDT due to the increase in the threshold voltage Vth may be offset by increase in the driving voltage Vgs. Additionally, the display driving circuit 30 may measure the electrical feature of each of the plurality of pixels PXs and perform the external compensation based on the measured value, thereby compensating for the change in the electrical feature due to the deviation or deterioration of the electrical features of the plurality of pixels PXs.

Figure 3:
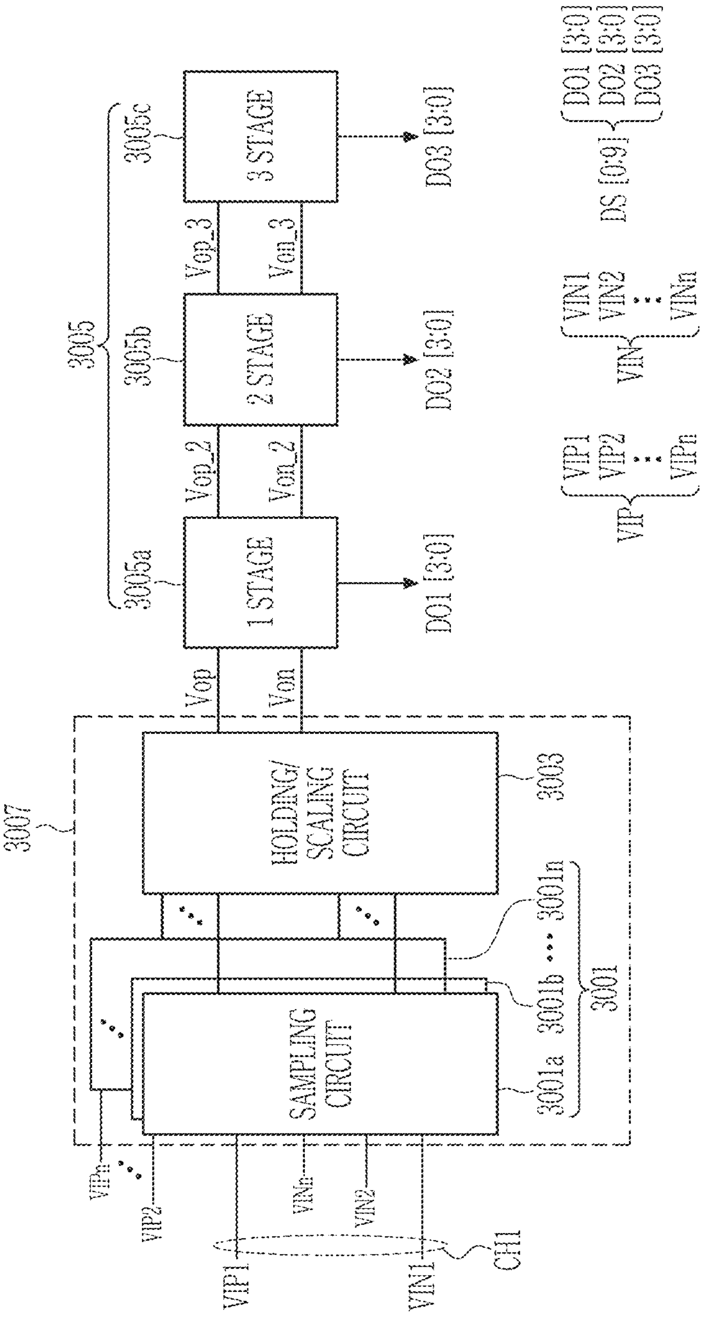
FIG. 3 is a block diagram showing an example of a sensing block according to some implementations.

FIG. 3 is a block diagram showing an example of a sensing block according to some implementations. In FIG. 3, the sensing block 303 may include an analog front end (AFE) 3007 and a plurality of ADCs 3005. The AFE 3007 may include a plurality of sampling circuits 3001 or 3001*a*, 3001*b*, . . . , and 3001*n*, and a holding/scaling circuit 3003.

The plurality of sampling circuits 3001 may respectively be connected to the plurality of pixels PXs included in the display panel 40 (in FIG. 1) through the plurality of sensing lines SL. Each of the plurality of sampling circuits 3001 may detect a feature of the corresponding pixel PX based on the sensing signal received through the connected sensing line SL.

In some implementations, a plurality of channels may be implemented in a differential manner. For example, two signal lines receiving a pair of input voltages (for example, VIP1 and VIN1) may form one channel. Here, one of the pair of input voltages (for example, VIP1) may be a high voltage actually input from the display panel 40. For example, the plurality of input voltages VIP may be first to mth sensing signals (here, m is a natural number of 2 or more). Another one of the input voltages (for example, VIN1) may be a reference voltage to implement the differential manner.

In FIG. 3, "n" channels (here, "n" is a natural number of 2 or more) are depicted for convenience of explanation, and the number of channels may be changed. In some implementations, one channel may be connected to at least one sensing line SL.

The plurality of sampling circuits 3001 may simultaneously sample the first to mth sensing signals based on the plurality of input voltages VIN, and transmit the sampled signals to the holding/scaling circuit 3003. For example, the plurality of sensing signals, for example, the first to mth sensing signals may be received through first to nth sensing lines SL1 to SLn, and each of the plurality of sampling circuits 3001 may provide the sensing signal selected from the first to mth sensing signals to the holding/scaling circuit 3003. In some implementations, the sensing signals sampled by the plurality of sampling circuits 3001 may be sequentially provided to the holding/scaling circuit 3003.

The holding/scaling circuit 3003 may amplify the signals received from the plurality of sampling circuits 3001 and sequentially deliver the amplified signals to the plurality of ADCs 3005. The holding/scaling circuit 3003 may amplify and provide the signals received from the plurality of sampling circuits 3001 for high-speed operations of the plurality of ADCs 3005 connected thereto. In some implementations, the holding/scaling circuit 3003 may include an amplifier. For example, the holding/scaling circuit 3003 may include the amplifier and a feedback capacitor. The holding/scaling circuit 3003 may include a plurality of holding switches and a plurality of reset switches.

In some implementations, the amplifier may also be instigated in the differential manner. For example, the amplifier may include two input terminals and two output terminals. One of the two input terminals may be selectively connected to one signal line group (for example, the signal lines receiving the input voltages VIP1, VIP2, . . . , and VIPn) of the plurality of channels, and the other one may be selectively connected to the other signal line group (for example, the signal lines receiving the input voltages VIN1, . . . , and VINn) of the plurality of channels. The amplifier may sequentially receive the plurality of sampled input voltages VIP and VIN, and generate a first output voltage Vop and a second output voltage Von that correspond thereto.

An offset voltage may be formed at the input terminal of the amplifier. When the number of sampling circuits to be connected to the holding/scaling circuit 3003 is increased, a parasitic capacitance caused by the parasitic capacitor formed on a line for inputting the signal to the amplifier may be increased. The increase in the parasitic capacitance may increase the offset voltage generated at the input terminal of the amplifier. Accordingly, it may be difficult to accurately sense the threshold voltage of the pixel PX, and it may be impossible to accurately compensate for the image data.

The plurality of ADCs 3005 may sequentially receive the first output voltage Vop and the corresponding second output voltage Von from the holding/scaling circuit 3003, amplify the received voltages, and convert the amplified voltages into digital signals. In some implementations, each of the plurality of ADCs 3005 may be implemented in the differential manner. In some implementations, each of the plurality of ADCs 3005 may include a common mode feedback circuit (CMFB). The CMFB may be operated using a switch, a capacitor, a clock, or the like at its output terminal to maintain a common mode of differential output voltages to facilitate the low-voltage or low-power operation of each of the plurality of ADCs 3005.

As shown in FIG. 3, the plurality of ADCs 3005 may include four ADC 3005*a*, 3005*b*, and 3005*c*. In some implementations, the plurality of ADCs 3005 may be connected to each other in a pipeline manner. For example, the ADC 3005*a* of a first stage (or stage #1) may digitize the first output voltage Vop and the second output voltage Von by 3 bits, and analogize the digitized output to generate a first output voltage Vop_2 and a second output voltage Von_2. For example, the ADC 3005*a* may subtract the analogized first output voltage Vop_2 and second output voltage Von_2 from a first input voltage VIP1 and the second input voltage VIN1, and transfer result values back to the ADC 3005*b* of a second stage (or stage #2). Similarly, an output value in the previous stage may pass through the ADC 3005*b* to be transferred to the ADC 3005*c* of a third stage (or stage #3). The bits in each stage may be output sequentially with a time difference. Accordingly, all bits extracted based on the first input voltage VIP and second input voltage VIN, which are the same as each other, may be arranged in a shift register (not shown) in a chronological order before being transferred to the timing controller 31. The ADC of a stage currently in progress may determine the bit by completely digitizing the first input voltage and the second input voltage, and may transfer, to the next stage, a result of re-analogizing the digitized output and a difference between the first input voltage and the second input voltage. Simultaneously, the next input voltage may be digitalized in the current stage.

In some implementations, each of the plurality of ADCs 3005 may generate a 10-bit data sensing signal DS, and each of the plurality of ADCs 3005 may transfer the generated data sensing signal DS to the timing controller 31. In some implementations, the plurality of ADCs 3005 may be instigated in another suitable manner. For example, each of the plurality of ADCs 3005 may generate a 12-bit data sensing signal DS.

Some of the plurality of sensing lines SL may be operated as active channels, and the rest of the plurality of sensing lines SL may be operated as dummy channels. When operated in the display mode, the display panel 40 may first sense output of the dummy channel, and then sense output of the active channel in order to accurately sense the output of each channel from the pixel PX. Here, when the display panel 40 is operated in the display mode, the active channel may be a sensing line outputting the pixel voltage or pixel signal from the pixel PX to the sensing block 303. In addition, when the display panel 40 is operated in the sensing mode, the dummy channel may be a sensing line outputting a floating voltage instead of the pixel voltage or the pixel signal to the sensing block 303 as the sensing signal. In some implementations, the dummy channel may not be actually connected to the display panel 40, and may be a sensing line outputting the floating voltage as the sensing signal. Among the plurality of sensing lines SL, the sensing line operated as the dummy channel may be predetermined. For example, the first sampling circuit 3001*a* or the second sampling circuit 3001*b* may be connected to the sensing line operated as the dummy channel, and the rest sampling circuit 3001*c*, . . . , or 3001*n* may be connected to the sensing line operated as the active channel. Additionally, the sensing block 303 may sense the sensing signal of the dummy channel before sensing the sensing signal of the active channel in order to accurately sense the sensing signal of the active channel.

In some implementations, the dummy channel may output the floating voltage as the sensing signal, and the sensing signal may thus be amplified while passing through the plurality of ADCs 3005 and may be outside a normal operation range of the ADC. For example, the output of the ADC 3005*c* of the third stage (or stage #3) may be outside the normal operation range of the ADC. The plurality of ADCs 3005 may be driven in the pipeline manner, and accordingly, the operation range of the ADC that is deviated by the dummy channel may also affect a case of sensing the output of the active channel.

Figure 4:
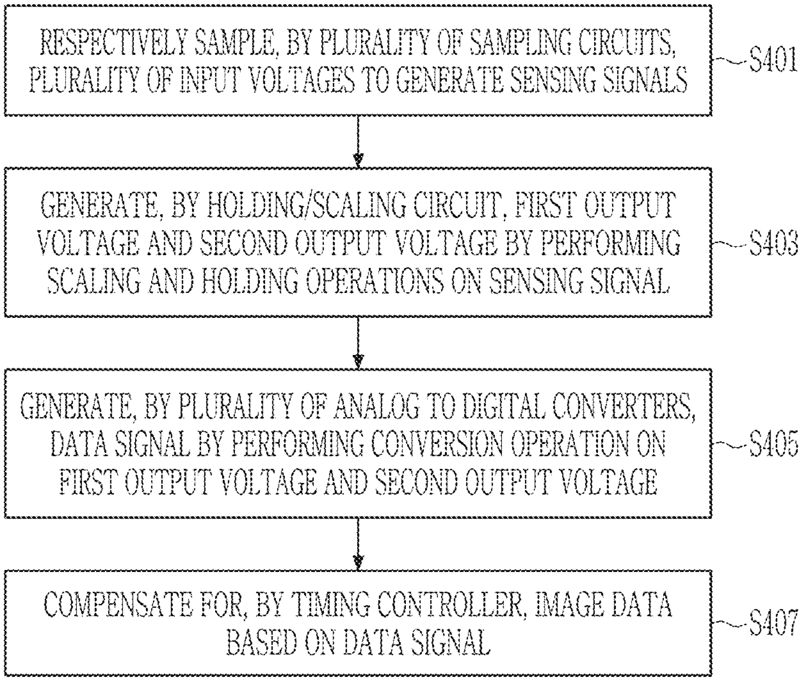
FIG. 4 is a flowchart showing an example of a method of operating the sensing block according to some implementations.

FIG. 4 is a flowchart showing an example of a method of operating the sensing block according to some implementations. In FIG. 4, the plurality of sampling circuits 3001 may respectively sample the plurality of input voltages to generate the sensing signals (S401). Hereinafter, a sample period may refer to a period in which each of the plurality of sampling circuits 3001 samples a first input voltage VIPi (here, "i" is a natural number of "n" or less).

The holding/scaling circuit 3003 may generate the first output voltage Vop and the second output voltage Von by performing scaling and holding operations on the sensing signal (S403).

Hereinafter, a hold period may refer to a period in which the holding/scaling circuit 3003 performs the scaling and holding operations. The scaling operation may be an operation in which the holding/scaling circuit 3003 sequentially scales the sampled sensing signals to the plurality of output voltages by using the amplifier and the feedback capacitor.

The holding operation may be an operation in which the holding/scaling circuit 3003 sequentially outputs the scaled sensing signals to the plurality of ADCs by using the amplifier and the capacitor.

The plurality of ADCs 3005 may generate the data sensing signal DS by performing a conversion operation on the first output voltage Vop and the second output voltage Von (S405).

Each of the plurality of ADCs 3005 may then transfer the generated data sensing signal DS to the timing controller 31.

The timing controller 31 may compensate for the image data based on the data sensing signal DS (S407). The timing controller 31 may then transfer the compensated image data to the data driver 33, and the data driver 33 may generate the data voltage based on the compensated image data.

Figure 5:
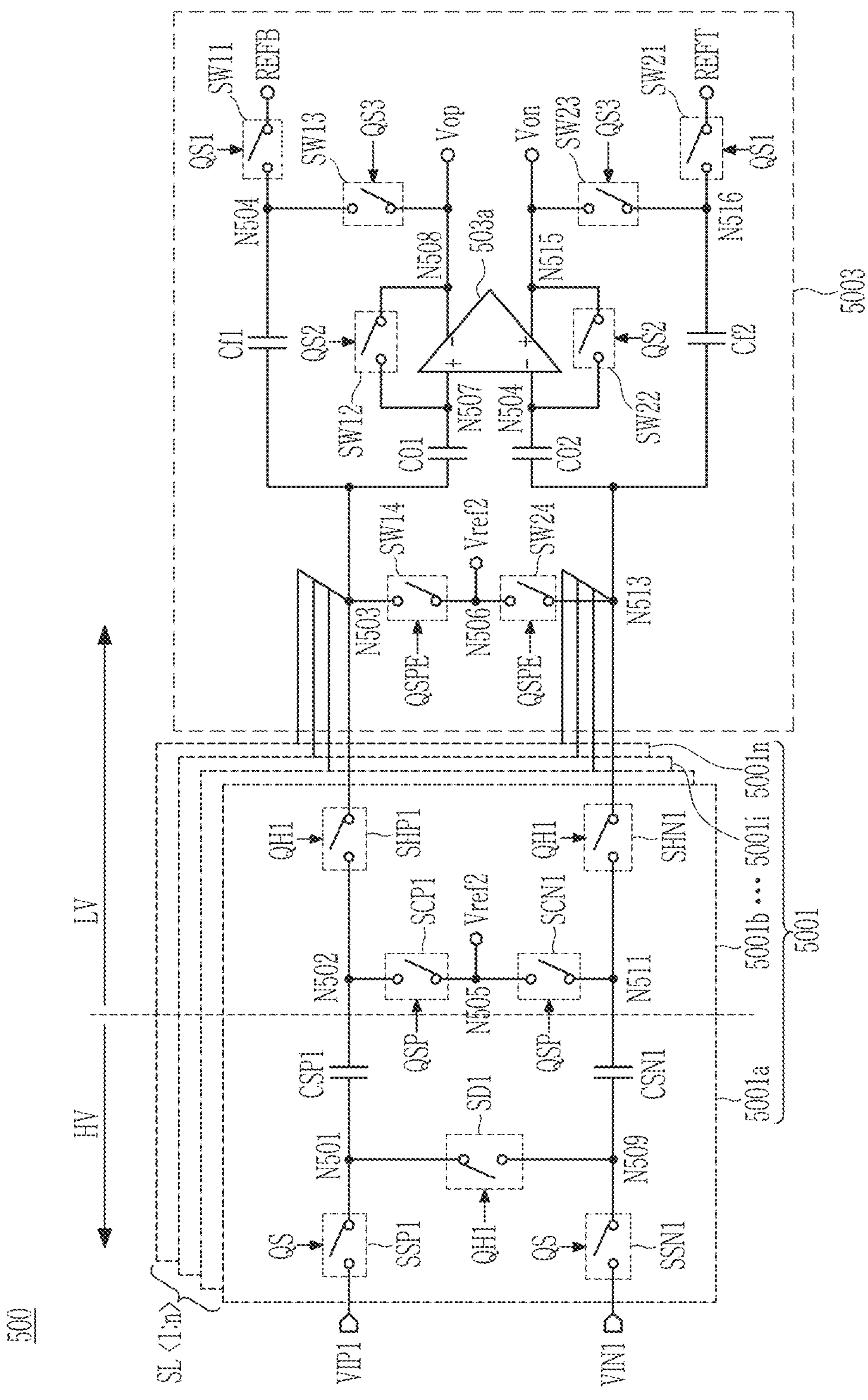
FIG. 5 is a diagram showing an example of an analog front end according to some implementations.

FIG. 5 is a diagram showing an example of an analog front end according to some implementations. In FIG. 5, an analog front end 500 may include a plurality of sampling circuits 5001 or 5001*a*, 5001*b*, . . . , and 5001*n* and a holding/scaling circuit 5003. Hereinafter, the description is provided based on the sampling circuit 5001*a*, and it may be understood that corresponding holding signals QH1 to QHn are respectively applied to the sampling circuits 5001*a*, 5001*b*, . . . , and 5001*n*.

The sampling circuit 5001*a* may include a plurality of sampling capacitors CSP1 and CSN1, a plurality of sampling switches SSP1 and SSN1, a differential switch SD1, a plurality of common mode switches SCP1 and SCN1, and a plurality of holding switches SHP1 and SHN1.

The first sampling switch SSP1 may be connected between a first channel that receives the first input voltage VIP1 and a first node N501. In addition, the second sampling switch SSN1 may be connected between the first channel that receives the second input voltage VIN1 and a ninth node N509.

The first sampling capacitor CSP1 may be connected between the first node N501 and a second node N502. In addition, the second sampling capacitor CSN1 may be connected between the ninth node N509 and an eleventh node N511.

The plurality of sampling switches SSP1 and SSN1 may be substantially simultaneously turned on in response to a first sampling signal QS so that the plurality of sampling capacitors CSP1 and CSN1 substantially simultaneously sample the plurality of input voltages VIP1 and VIN1. The plurality of sampling switches SSP1 and SSN1 may be turned on to transfer the first input voltage VIP1 to the first node N501 and the second input voltage VIN1 to the ninth node N509. Accordingly, the plurality of sampling switches SSP1 and SSN1 may control their connection relationships with the plurality of sensing lines SL in response to the sampling signal QS.

The differential switch SD1 may have one end connected to the first node N501 and the other end connected to the ninth node N509. The differential switch SD1 may be operated in response to the first holding signal QH1.

The plurality of common mode switches SCP1 and SCN1 may be connected in series with each other between the second node N502 and the eleventh node N511. For example, the first common mode switch SCP1 may have one end connected to the second node N502 and the other end connected to a fifth node N505, and the second common mode switch SCN1 may have one end connected to the fifth node 505 and the other end connected to the eleventh node N511. The first common mode switch SCP1 and the second common mode switch SCN1 may connect a common mode voltage Vref2 to the second node N502 and the eleventh node N511 in response to a second sampling signal QSP.

The first holding switch SHP1 may have one end connected to the second node N502 and the other end connected to a third node N503. The second holding switch SHN1 may have one end connected to the eleventh node N511 and the other end connected to a thirteenth node N513. The first holding switch SHP1 and the second holding switch SHN1 may be substantially simultaneously turned on in response to the first holding signal QH1. The plurality of holding switches SHP1 and SHN1 may be turned on to transfer the voltage at the second node N502 to the third node N503 and the voltage at the eleventh node N511 to the thirteenth node N513.

For example, as the plurality of sampling circuits 5001 activate the first sampling signal QS in the sample period, the plurality of sampling switches SSP1, SSN1, . . . , SSPn, and SSNn may be substantially simultaneously turned on, and the plurality of sampling capacitors CSP1, CSN1, . . . , CSPn, and CSNn may have respective one ends electrically connected to the plurality of channels, thus substantially simultaneously sampling the plurality of input voltages VIP1, VIN1, . . . , VIPn, and VINn received from the plurality of channels.

In addition, as the plurality of sampling circuits 5001 activate the second sampling signal QSP in the sample period, the plurality of common mode switches SCP1, SCN1, . . . , SCPn, and SCNn may be substantially simultaneously turned on, and the common mode voltage Vref2 may be provided to the other end of each of the plurality of sampling capacitors CSP1, CSN1, . . . , CSPn, and CSNn.

In some implementations, the second sampling signal QSP may be activated simultaneously with the first sampling signal QS, and deactivated before the first sampling signal QS. For example, the plurality of common mode switches SCP1, SCN1, . . . , SCPn, and SCNn may be turned off before the plurality of sampling switches SSP1, SSN1, . . . , SSPn, and SSNn to thus prevent charge injection that may occur when the sampling capacitors CSP1, CSN1, . . . , CSPn, and CSNn are switched from the sampling operation to the holding operation. In the sample period, each of the plurality of holding signals QH1 to QHn may be at a disable level.

As the plurality of holding signals QH1 to QHn are sequentially activated in the hold period after the sample period, the plurality of holding switches SHP1, SHN1, . . . , SHPn, and SHNn and the plurality of differential switches SD1, . . . , and SDn may be sequentially activated, and the sampled plurality of input voltages VIP1, VIN1, . . . , VIPn, and VINn may be sequentially held and scaled.

When the first holding signal QH1 is activated, the holding switches SHP1 and SHN1 and the differential switch SD1 may be turned on, one end of the sampling capacitor CSP1 and one end of the sampling capacitor CSN1 may be electrically connected to each other, and the other end of each of the sampling capacitors CSP1 and CSN1 may be electrically connected to an amplifier 503*a*.

The holding/scaling circuit 5003 may include a plurality of common mode switches SW14 and SW24, a plurality of offset capacitors C01 and C02, the amplifier 503*a*, a plurality of feedback capacitors Cf1 and Cf2, and a plurality of switches SW11, SW12, SW13, SW21, SW22, and SW23.

The plurality of common mode switches SW14 and SW24 may be connected in series with each other between the third node N503 and the thirteenth node N513. For example, the first common mode switch SW14 may have one end connected to the third node N503 and the other end connected to a sixth node N506. The second common mode switch SW24 may have one end connected to the sixth node N506 and the other end connected to the thirteenth node N513. The first common mode switch SW14 and the second common mode switch SW24 may connect the common mode voltage Vref2 to the third node N503 and the thirteenth node N513 in response to a third sampling signal QSPE. Meanwhile, the second sampling signal QSP and the third sampling signal QSPE may be the same signal, and the present disclosure is not limited thereto.

The plurality of offset capacitors C01 and C02 and the plurality of feedback capacitors Cf1 and Cf2 may be set considering that the first input voltage VIP1 and the second input voltage VIN1 are respectively input as differential signals to the first input terminal (+) and second input terminal (−) of the amplifier 503*a* via the sampling circuit 5001*a*. The first offset capacitor C01 may be connected between the third node N503 and a seventh node N507. The second offset capacitor C02 may be connected between the thirteenth node N513 and a fourteenth node N514.

The amplifier 503*a* may generate the plurality of output voltages Vop and Von by sequentially receiving the plurality of input voltages VIP1 and VIN1 sampled by the sampling capacitors CSP1 and CSN1. As described above, the amplifier 503*a* may be instigated in the differential manner. For example, the amplifier 503*a* may include two input terminals and two output terminals. The two input terminals may have one selectively connected to a signal line that receives one of the plurality of first input voltages VIP, and the other selectively connected to a signal line that receives one of the plurality of second input voltages VIN. In addition, two output terminals may sequentially output the plurality of output voltages Vop and Von in the differential manner.

The first input terminal (+) of the amplifier 503*a* may be connected to the seventh node N507, and the second input terminal (−) of the amplifier 503*a* may be connected to the fourteenth node N514.

The first offset capacitor C01 may store a voltage corresponding to an offset voltage generated at the first input terminal (+) of the amplifier 503*a*. In addition, the second offset capacitor C02 may store a voltage corresponding to an offset voltage generated at the second input terminal (−) of the amplifier 503*a*. When the output signals of the sampling circuit 5001*a* are input to the amplifier 503*a*, the plurality of offset capacitors C01 and C02 may store the offset voltages of the input terminals of the amplifier 503*a*. Accordingly, the output voltages Vop and Von of the amplifier 503*a* may be output without being affected by the offset voltages.

The plurality of feedback capacitors Cf1 and Cf2 may be connected between the input terminal and output terminal of the amplifier 503*a*. For example, the feedback capacitor Cf1 may be connected between the first input terminal and first output terminal of an amplifier 132*a*, and the feedback capacitor Cf2 may be connected between the second input terminal and second output terminal of the amplifier 132*a*. The feedback capacitors Cf1 and Cf2 may be shared by the plurality of channels.

In some implementations, the plurality of switches SW11, SW12, SW13, SW21, SW22, and SW23 may be metal oxide semiconductor (MOS) transistors.

Each of the switches SW12 and SW22 may have one end connected to the output terminal of the amplifier 503*a* and the other end connected to the input terminal of the amplifier 503*a*. For example, the switch SW12 may control transfer of the voltage at an eighth node N508 to the seventh node N507 based on a switch control signal QS2. The switch SW22 may control transfer of the voltage at a fifteenth node N515 to the fourteenth node N514 based on the switch control signal QS2.

Each of the switches SW13 and SW23 may have one end connected to the output terminal of the amplifier 503*a* and the other end connected to one end of each of the feedback capacitors Cf1 and Cf2. For example, the switch SW13 may control transfer of the voltage at the eighth node N508 to a fourth node N504, which is one end of the feedback capacitor Cf1, based on a switch control signal QS3. The switch SW23 may control transfer of the voltage at the fifteenth node N515 to a sixteenth node N516, which is one end of the feedback capacitor Cf2, based on the switch control signal QS3.

Each of the switches SW12 and SW22 may have one end connected to an input terminal of each of reference voltages REFB and REFT and the other end connected to one end of each of the feedback capacitors Cf1 and Cf2. For example, the switch SW11 may control transfer of the reference voltage REFB to the fourth node N504 based on a switch control signal QS1. The switch SW21 may control transfer of the reference voltage REFT to the sixteenth node N516 based on the switch control signal QS1.

The switches SW13 and SW23 and the switches SW11 and SW21 may be connected in parallel with each other to the feedback capacitors Cf1 and Cf2.

The amplifier 503*a* and the feedback capacitors Cf1 and Cf2 may generate the first output voltage Vop and the second output voltage Von by substantially simultaneously performing the scaling and holding operations on the input voltages VIP1 and VIN1 received and sampled from the first channel. For example, the feedback capacitors Cf1 and Cf2 may be used by the first channel. The feedback capacitors Cf1 and Cf2 may be reset immediately after the first holding signal QH1 is deactivated.

In some implementations, the holding/scaling circuit 5003 may perform the holding and scaling operations on the first input voltage VIP in the scaling and hold periods. While the sampling circuit 5001*a* performs the sampling operation, the holding/scaling circuit 5003 may turn on the switches SW11, SW12, and SW14 and turn off the switch SW13.

As the switch SW12 is turned on, the amplifier 503*a* may act as a unity buffer, and the voltage at the seventh node N507 of the amplifier 503*a* may be intactly transferred to the output terminal. For example, the offset capacitor C01 may store the voltage output from the eighth node N508 of the amplifier 503*a* as the seventh node N507, which is the input terminal of the amplifier 503*a*, and the eighth node N508, which is the output terminal, are connected to each other. For example, the offset capacitor C01 may store an offset voltage that has the same magnitude as and an opposite sign to those of the offset voltage generated at the seventh node N507. For example, 1 may be a set amplification ratio of the amplifier 503*a*.

In addition, as the switch SW13 is turned off and the switch SW11 is turned on, the feedback capacitor Cf1 may be disconnected from the eighth node N508 of the amplifier 503*a* and connected to the reference voltage REFB. Accordingly, the feedback capacitor Cf1 may store the reference voltage REFB.

For example, the offset capacitor C01 may store the offset voltage that has the same magnitude as and the opposite sign to those of the offset voltage generated at the seventh node N507, that is, the input terminal (+) of the amplifier 503*a*.

The holding/scaling circuit 5003 may also perform an operation similar to the operation performed on the first input voltage VIP on the second input voltage VIN in the scaling and hold periods.

The reference voltage REFB and the reference voltage REFT may be differently applied based on a configuration of the circuit. When configured in a differential amplification circuit, the reference voltage REFB and the reference voltage REFT may use the same voltage. For example, each of the reference voltage REFB and the reference voltage REFT may have a value that is ½ of a power supply voltage. The reason is to prevent distortion occurring due to signal saturation due to a low power supply voltage.

Next, the holding/scaling circuit 5003 may turn off the switches SW11, SW12, and SW14 and turn on the switch SW13 while the amplifier 503*a* generates the output voltage for the sampled input voltage.

As the switch SW12 is turned off, the seventh node N507 and the eighth node N508 may be disconnected from each other, and the unity buffer function of the amplifier 503*a* may be released. For example, the amplifier 503*a* may amplify a signal applied to the seventh node N507 by a predetermined amplification ratio and then output the same.

As the switch SW11 is turned off and the switch SW13 is turned on, the feedback capacitor Cf1 may be disconnected from the reference voltage REFB. In addition, the feedback capacitor Cf1 may be connected to the sampling capacitor CSP1 to form a feedback loop.

The offset voltage stored in the offset capacitor C01 may have the same amount as and an opposite polarity to those of an offset voltage Vos1 at the seventh node N507 of the amplifier 503*a*, and the offset voltage stored in the offset capacitor C01 and the offset voltage at the seventh node N507 may offset each other. For example, the amplifier 503*a* may amplify and output the signal without being affected by the offset voltage generated at the seventh node N507. In addition, the voltage charged in the sampling capacitor CSP1 may be transferred to the feedback capacitor Cf1. Accordingly, the first input voltage VIP1 may be output from the amplifier 503*a* by being amplified based on a ratio of the sampling capacitor CSP1 to the feedback capacitors Cf1.

In some implementations, the signal input to the amplifier 503*a* may be amplified by the amplification ratio of CSP1/Cf1, and may not be affected by the offset voltage. In addition, a ratio Cs/Cf of the sampling capacitor CSP1 or Cs2 to the feedback capacitor Cf1 or Cf2 may be predetermined.

Similarly, when the second holding signal QH2 is activated, the amplifier 503*a* and the feedback capacitors Cf1 and Cf2 may substantially simultaneously perform the scaling and holding operations on the input voltages VIP2 and VIN2 received and sampled from the second channel, thus generating the first output voltage Vop and the second output voltage Von. In some implementations, the feedback capacitors Cf1 and Cf2 may be used by the second channel. For example, when the i-th holding signal QHi is activated, the amplifier 503*a* and the feedback capacitors Cf1 and Cf2 may substantially simultaneously perform the scaling and holding operations on the input voltages VIPn and VINn received and sampled from the i-th channel, thus generating a scaled down sensing signal VSENM. For example, the feedback capacitors Cf1 and Cf2 may be used by the i-th channel.

As described above, the feedback capacitors Cf1 and Cf2 may be shared by the plurality of channels in such a way that the feedback capacitors are sequentially used by the plurality of channels.

In some implementations, some of the sampling circuits 5001*a* may be implemented to include high-voltage elements, and the holding/scaling circuit 5003 may be implemented to include low-voltage elements.

For example, the plurality of input voltages VIP1 and VIN1 may be high voltages which are relatively high. Accordingly, each of the plurality of sampling switches SSP1 and SSN1 and the plurality of differential switches SD1, included in the sampling circuit 5001*a*, may include a high-voltage switching element that may withstand the high voltage (that is, the switching element which is not damaged by the high voltage). In some implementations, the high-voltage switching element may include a high-voltage transistor having a relatively high threshold voltage.

In addition, each of the plurality of sampling capacitors CSP1 and CSN1 included in the sampling circuit 5001*a* may also include a high voltage capacitor which may withstand the high voltage.

Some components of the sampling circuit 5001*a* and the holding/scaling circuit 5003 may be operated using a low voltage which is relatively low. Each of the plurality of holding switches SHP1 and SHN1 and the plurality of common mode switches SCP1 and SCN1, included in the sampling circuit 5001*a*, and the plurality of switches SW14, SW24, SW12, SW22, SW11, SW21, SW13, and SW23 included in the holding/scaling circuit 5003 may include a low-voltage switching element. In some implementations, the low-voltage switching element may include a low-voltage transistor having a relatively low threshold voltage. In addition, each of the feedback capacitors Cf1 and Cf2 included in the holding/scaling circuit 5003 may also include a low voltage capacitor.

The following equation indicates the first output voltage Vop and the second output voltage Von for the first input voltage VIP input to the AFE 500 (in FIG. 5) based on the above configuration. A similar equation may be applied for the second input voltage VIN.

$$V_{op} - V_{on} = \frac{CSP1}{Cf1}(VIP - VIN) - (REFT - REFB) \quad \text{[Equation 2]}$$

For convenience of explanation, the sampling circuit 5001*a* is described with reference to FIG. 5, and each of the plurality of sampling circuits 5001 may include a structure similar to that of the sampling circuit 5001*a*.

Although FIG. 5 depicts that the common mode voltage Vref2 is input to both the fifth node N505 and the sixth node N506, some implementations are not limited thereto, and the voltage input to the fifth node N505 and the voltage input to the sixth node N506 may be different from each other.

Figure 6:
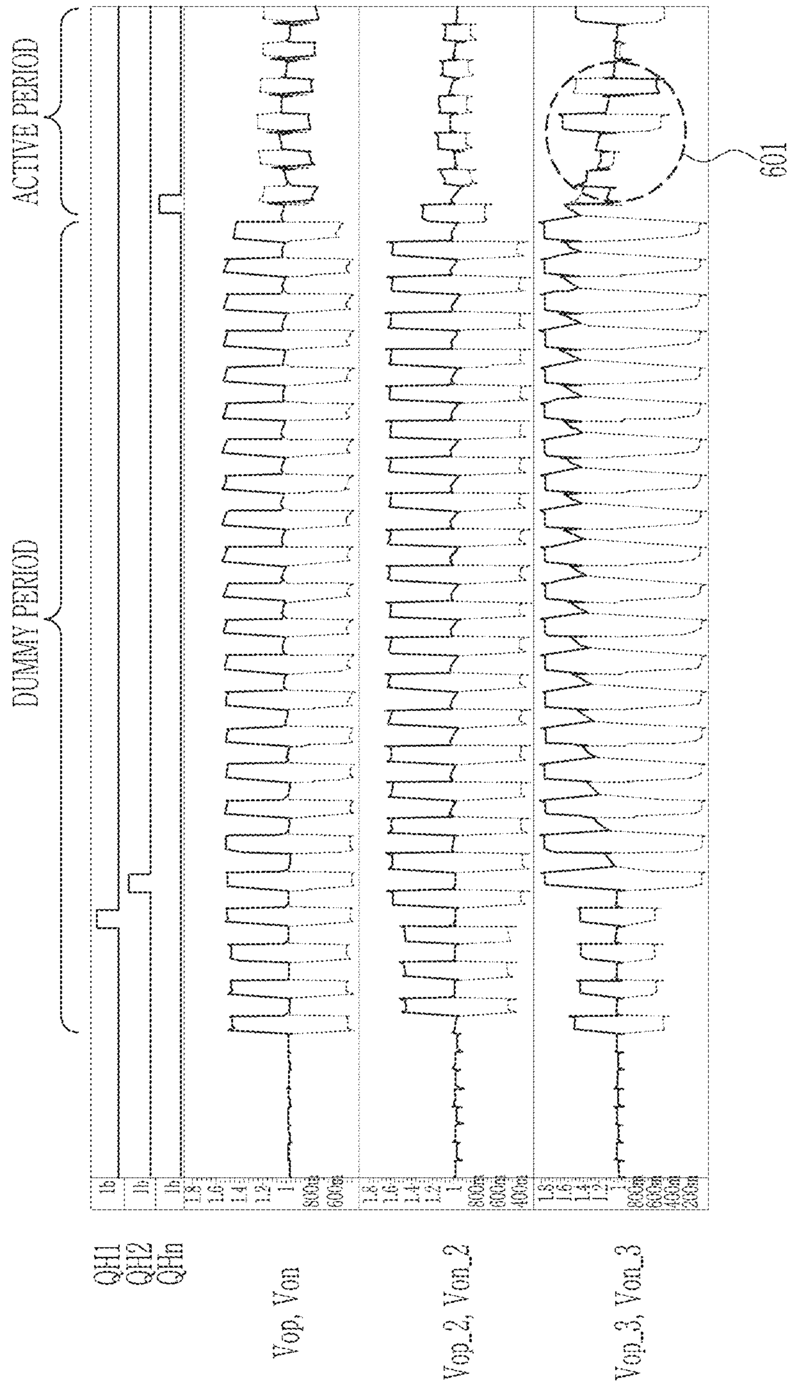
FIG. 6 is a graph showing an output of each of a plurality of analog to digital converters (ADCs) in an example of a display system that includes the analog front end of FIG. 5 according to some implementations.

FIG. 6 is a graph showing an output of each of a plurality of analog to digital converters (ADCs) in an example of a display system that includes the analog front end of FIG. 5, according to some implementations. FIG. 6 assumes a case where each of the plurality of ADCs generate the 10-bit data sensing signal DS.

In FIG. 6 the plurality of holding signals QH, the first and second output voltages Vop and Von, and the voltages Vop, Von, Vop_2, Von_2, Vop_3, and Von_3 are output while passing through the plurality of stages of the plurality of ADCs 3005 (of FIG. 3).

In some implementations, the first input voltage VIP may be the same as the second input voltage VIN or may have a value larger than the second input voltage VIN by a first value. For example, the first value may range from zero V to 4 V. The sampling circuit 5001 and the holding/scaling circuit 5003 may perform the voltage scaling to process a voltage difference of the first value by using the plurality of ADCs 3005 (of FIG. 3). For example, it may be set that Cf1=2CSP1 and 1 V is a difference between the first reference voltage REFT and the second reference voltage REFB. Accordingly, an output value (that is, the first output voltage Vop—the second output voltage Von) for the first input voltage VIP and the second input voltage VIN may be −1 V when the first value is zero and 1 V when the first value is 4 V. These values may fall within a range where an input range of the ADC may be used to its maximum potential.

In FIG. 6, an active period for sensing the output of the active channel may be performed after the dummy period for performing operations outside an operation range of the ADC 3005*c* multiple times. A first portion 601 may be an initial active period, in which the voltage input through the CMFB is unstable due to an influence of the dummy period. For example, the voltage outside the operation range of the ADC in the dummy period (for example, a voltage below-1 V or a voltage above 1 V) may be amplified through the amplifier 503*a* and the plurality of stages (for example, the first stage (or stage #1) and the second stage (or stage #2), and may be saturated in the second stage (stage #2). The voltage input through the CMFB in the second stage (or stage #2) may become unstable, thus also changing Vop_3 and Von_3, which are the outputs in the second stage (or stage #2) as shown in FIG. 6. Accordingly, the plurality of ADCs 3005 may fail to generate the accurate data sensing signal DS.

Figure 7:
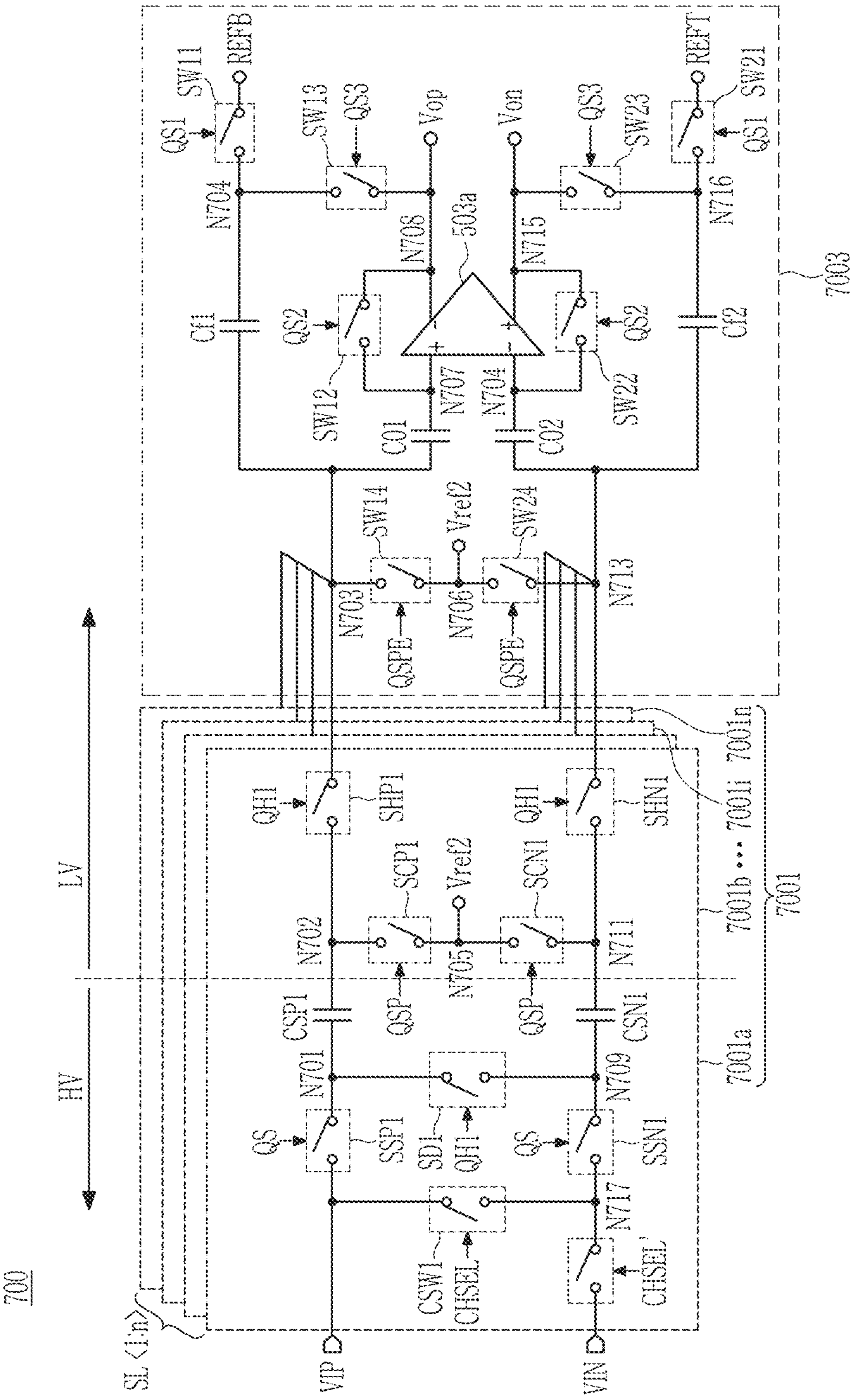
FIG. 7 is a diagram showing an example of an analog front end according to some implementations.

FIG. 7 is a diagram showing an example of an analog front end according to some implementations. Hereinafter, the description omits descriptions overlapping those provided with reference to FIG. 5.

In FIG. 7, an analog front end 700 may include a plurality of sampling circuits 7001 or 7,001*a*, 7001*b*, . . . , and 7001*n* and a holding/scaling circuit 7003.

The sampling circuit 7001*a* may include the plurality of sampling capacitors CSP1 and CSN1, the plurality of sampling switches SSP1 and SSN1, the differential switch SD1, the plurality of common mode switches SCP1 and SCN1, the plurality of holding switches SHP1 and SHN1, and a plurality of channel selection switches CSW1 and CSW1'.

The sampling circuit 7001*a* may be substantially the same as the sampling circuit 5001*a* of FIG. 5, except that the sampling circuit 7001*a* includes the plurality of channel selection switches CSW1 and CSW1'.

The first channel selection switch CSW1 may have one end connected between the first channel that receives the first input voltage VIP1 and a seventeenth node N717. The first channel selection switch CSW1 may be operated in response to a first channel selection signal CHSEL. For example, the first channel selection signal CHSEL may be a signal for controlling connection between a random channel and the sampling circuit corresponding to the random channel among the plurality of sampling circuits 7001.

The first channel selection switch CSW1' may have one end connected to the first channel that receives the second input voltage VIN1 and the other end connected between the seventeenth node N717. The first channel selection switch CSW1' may be operated in response to an inverted first channel selection signal CHSEL'.

For example, as the plurality of sampling circuits 7001 activate the first sampling signal QS in the sample period, the plurality of sampling switches SSP1, SSN1, . . . , SSPn, and SSNn may be substantially simultaneously turned on, and the plurality of sampling capacitors CSP1, CSN1, . . . , CSPn, and CSNn may have respective one ends electrically connected to the plurality of channels, thus substantially simultaneously sampling the plurality of input voltages VIP1, VIN1, . . . , VIPn, and VINn received from the plurality of channels.

In addition, as the plurality of sampling circuits 7001 activate the second sampling signal QSP in the sample period, the plurality of common mode switches SCP1, SCN1, . . . , SCPn, and SCNn may be substantially simultaneously turned on, and the common mode voltage Vref2 may be provided to the other end of each of the plurality of sampling capacitors CSP1, CSN1, . . . , CSPn, and CSNn.

In some implementations, the second sampling signal QSP may be activated simultaneously with the first sampling signal QS, and deactivated before the first sampling signal QS. For example, the plurality of common mode switches SCP1, SCN1, . . . , SCPn, and SCNn may be turned off before the plurality of sampling switches SSP1, SSN1, . . . , SSPn, and SSNn to thus prevent charge injection that may occur when the sampling capacitors CSP1, CSN1, . . . , CSPn, and CSNn are switched from the sampling operation to the holding operation.

As the plurality of holding signals QH1 to QHn are sequentially activated in the hold period after the sample period, the plurality of holding switches SHP1, SHN1, . . . , SHPn, and SHNn and the plurality of differential switches SD1, . . . , and SDn may be sequentially activated, and the sampled plurality of input voltages VIP1, VIN1, . . . , VIPn, and VINn may be sequentially held and scaled.

When the first holding signal QH1 is activated, the holding switches SHP1 and SHN1 and the differential switch SD1 may be turned on, one end of the sampling capacitor CSP1 and one end of the sampling capacitor CSN1 may be electrically connected to each other, and the other end of each of the sampling capacitors CSP1 and CSN1 may be electrically connected to an amplifier 703*a*.

The holding/scaling circuit 7003 may include the plurality of common mode switches SW14 and SW24, the plurality of offset capacitors C01 and C02, the amplifier 703*a*, the plurality of feedback capacitors Cf1 and Cf2, and the plurality of switches SW11, SW12, SW13, SW21, SW22, and SW23. The holding/scaling circuit 7003 may be substantially the same as the holding/scaling circuit 5003 of FIG. 5.

In the case of the active channel, the sampling circuit 7001*a* may turn off the first channel selection switch CSW1 through the first channel selection signal CHSEL at the disable level, and simultaneously turn on the first' channel selection switch CSW1' through the inverted first channel selection signal CHSEL'. Accordingly, the operation of the AFE 700 may be substantially similar to the operation of the AFE 500 in FIG. 5.

However, in the case of the dummy channel, the sampling circuit 7001*a* may turn on the first channel selection switch CSW1 through the first channel selection signal CHSEL at an enable level, and simultaneously turn off the first' channel selection switch CSW1' through the inverted first channel selection signal CHSEL'. Accordingly, the first input voltage VIP1 may be transferred to the seventeenth node N717. For example, the same voltage as the first input voltage VIP1 may be input as the second input voltage VIN1. Accordingly, referring to Equation 2, the output value (that is, the first output voltage Vop—the second output voltage Von) may be expressed as the difference between the first reference voltage REFT and the second reference voltage REFB. For example, the output value may be −1 V when the first reference voltage REFT—the second reference voltage REFB=1 V. The operation range of the ADC may be −1 V to 1 V, and the sensing block 303 (of FIG. 1) may generate data corresponding to a gray of zero. However, the sensing block 303 (of FIG. 1) may generate data corresponding to a threshold value (that is, −1 V) of the operation range of the ADC. Accordingly, there is a possibility that the data is outside the operation range of the ADC if there is a slight error. For example, there is a possibility that the data is outside the operation range of the ADC if the error occurs between the ratio of the sampling capacitors CSP1 and CSN1 to the feedback capacitors Cf1 and Cf2 and a predetermined value.

For convenience of explanation, the sampling circuit 7001*a* is described with reference to FIG. 7, and each of the plurality of sampling circuits 7001 may include a structure similar to that of the sampling circuit 7001*a*.

Figure 8:
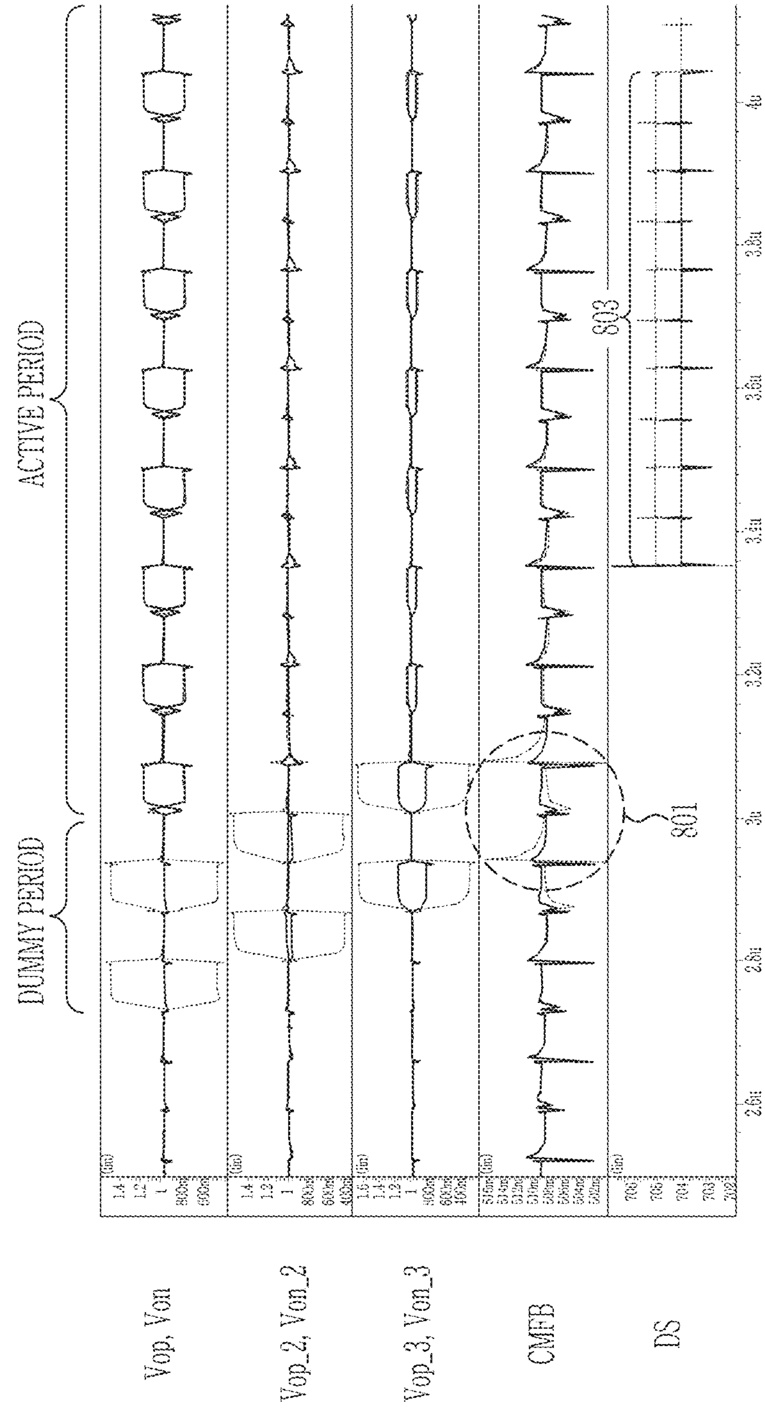
FIG. 8 is a graph showing an output of each of a plurality of ADCs in an example of a display system that includes the analog front end of FIG. 7 according to some implementations.

FIG. 8 is a graph showing the output of each of the plurality of ADCs in an example of a display system that includes the analog front end of FIG. 7 according to some implementations. FIG. 8 assumes a case where each of the plurality of ADCs generates the 10-bit data sensing signal DS.

In FIG. 8 the first output voltages Vop_2 and Vop_3, the second output voltages Von_2 and Von_3, a CMFB voltage, and the data sensing signal DS, are output while passing through the first output voltage Vop, the second output voltage Von, and the plurality of stages of the plurality of ADCs 3005 (in FIG. 3).

In some implementations, the first input voltage VIP may be the same as the second input voltage VIN or may have a value larger than the second input voltage VIN by the first value. For example, the first value may be 4 V. Accordingly, the sampling circuit 7001 and the holding/scaling circuit 7003 may perform the voltage scaling to process a voltage difference of 4 V by using the plurality of ADCs 3005 (of FIG. 3). For example, it may be set that Cf1=2Cs and 1 V is a difference between the first reference voltage REFT and the second reference voltage REFB. Accordingly, the output value (that is, the first output voltage Vop—the second output voltage Von) for the first input voltage VIP and the second input voltage VIN may range from −1 V to 1 V.

These values may fall within the range where the input range of the ADC may be used to its maximum potential.

The sensing block 303 (of FIG. 1) may generate the data corresponding to the gray of zero. The active period for sensing the output of the active channel may be performed after the dummy period. As described above, the input voltages VIP and VIN may be amplified through the amplifier 703*a* and the plurality of ADCs 3005 (of FIG. 3). Accordingly, the first output voltage Vop_3 and the second output voltage Von_3 may be saturated, thus changing the CMFB voltage of the amplifier (AMP) in the ADC 3005*b* of the second stage (or stage #2). For example, as shown in a first portion 801 of FIG. 8, the voltage input to the AMP through the CMFB in the ADC 3005*b* of the second stage may be changed.

When the CMFB of the second stage is unstable in the dummy period, at least one clock may be needed for the CMFB to return to a stable state. Accordingly, the ADC 3005*b* may be affected by the unstable CMFB in the initial active period. The unstable CMFB in the dummy period may cause an error in a code of the initial active period. For example, as shown in FIG. 8, the code error may occur in a second period 803. The unstable CMFB occurring in the dummy channel may affect a code value of the active channel.

Figure 9:
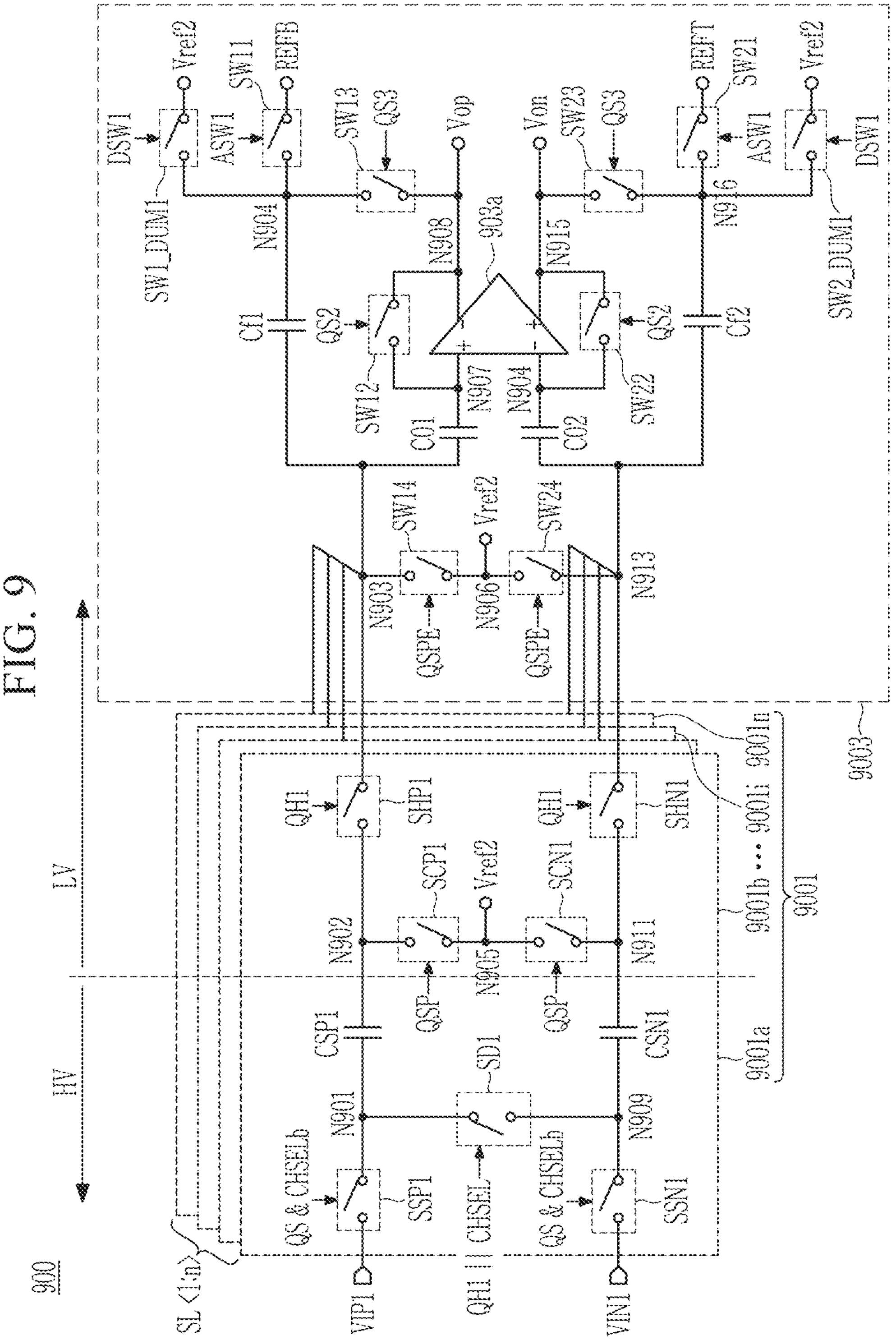
FIG. 9 is a diagram showing an example of an analog front end according to some implementations.

FIG. 9 is a diagram showing an example of an analog front end according to some implementations. Hereinafter, the description omits descriptions overlapping those provided with reference to FIG. 5.

In FIG. 9, an analog front end 900 may include a plurality of sampling circuits 9001 or 9,001*a*, 9001*b*, . . . , and 9001*n* and a holding/scaling circuit 9003.

The sampling circuit 9001*a* may include the plurality of sampling capacitors CSP1 and CSN1, the plurality of sampling switches SSP1 and SSN1, the differential switch SD1, the plurality of common mode switches SCP1 and SCN1, and the plurality of holding switches SHP1 and SHN1.

The plurality of sampling switches SSP1 and SSN1 may be substantially simultaneously turned on in response to the first sampling signal QS and a channel selection signal CHSELb. The plurality of sampling switches SSP1 and SSN1 may be turned on to transfer the first input voltage VIP1 to the first node N501 and the second input voltage VIN1 to the ninth node N509.

The differential switch SD1 may have one end connected to the first node N501 and the other end connected to the ninth node N509. The differential switch SD1 may be operated in response to the first holding signal QH1 or a channel selection signal CHSEL. The channel selection signal CHSEL may be a signal indicating whether a channel connected to the sampling circuit 9001*a* is the dummy channel or the active channel. The channel selection signal CHSELb may be an inverted signal of the channel selection signal CHSEL. The plurality of sampling switches SSP1 and SSN1 may be turned off regardless of whether the first sampling signal QS is activated when the channel selection signal CHSEL indicates the dummy channel, that is, when zero is a value of the inverted channel selection signal CHSELb. The differential switch SD1 may be turned on when the channel selection signal CHSEL indicates the dummy channel or when the first holding signal QH1 is activated.

For example, as the plurality of sampling circuits 9001 activate the first sampling signal QS in the sample period, the plurality of sampling switches SSP1, SSN1, . . . , SSPn, and SSNn may be substantially simultaneously turned on, and the plurality of sampling capacitors CSP1, CSN1, . . . , CSPn, and CSNn may have respective one ends electrically connected to the plurality of channels, thus substantially simultaneously sampling the plurality of input voltages VIP1, VIN1, . . . , VIPn, and VINn received from the plurality of channels.

In addition, as the plurality of sampling circuits 9001 activate the second sampling signal QSP in the sample period, the plurality of common mode switches SCP1, SCN1, . . . , SCPn, and SCNn may be substantially simultaneously turned on, and the common mode voltage Vref2 may be provided to the other end of each of the plurality of sampling capacitors CSP1, CSN1, . . . , CSPn, and CSNn.

In some implementations, the second sampling signal QSP may be activated simultaneously with the first sampling signal QS, and deactivated before the first sampling signal QS. For example, the plurality of common mode switches SCP1, SCN1, . . . , SCPn, and SCNn may be turned off before the plurality of sampling switches SSP1, SSN1, . . . , SSPn, and SSNn to thus prevent charge injection that may occur when the sampling capacitors CSP1, CSN1, . . . , CSPn, and CSNn are switched from the sampling operation to the holding operation. In the sample period, the plurality of holding signals QH1 to QHn may be at the disable level.

As the plurality of holding signals QH1 to QHn are sequentially activated in the hold period after the sample period, the plurality of holding switches SHP1, SHN1, . . . , SHPn, and SHNn and the plurality of differential switches SD1, . . . , and SDn may be sequentially activated, and the sampled plurality of input voltages VIP1, VIN1, . . . , VIPn, and VINn may be sequentially held and scaled.

When the first holding signal QH1 is activated, the holding switches SHP1 and SHN1 and the differential switch SD1 may be turned on, one end of the sampling capacitor CSP1 and one end of the sampling capacitor CSN1 may be electrically connected to each other, and the other end of each of the sampling capacitors CSP1 and CSN1 may be electrically connected to an amplifier 903*a*.

The holding/scaling circuit 9003 may include the plurality of common mode switches SW14 and SW24, the plurality of offset capacitors C01 and C02, the amplifier 903*a*, the plurality of feedback capacitors Cf1 and Cf2, the plurality of switches SW11, SW12, SW13, SW21, SW22, and SW23, and a plurality of dummy channel switches SW1_DUM1 and SW2_DUM1.

The holding/scaling circuit 9003 may be substantially the same as the holding/scaling circuit 5003 of FIG. 5, except that the holding/scaling circuit 9003 includes the plurality of dummy channel switches SW1_DUM1 and SW2_DUM1, and the switches SW12 and SW22 are controlled by an active control signal ASW1.

The first dummy channel switch SW1_DUM1 may have one end connected to the input terminal of the common mode voltage Vref2 and the other end connected to a fourth node N904. The first dummy channel switch SW1_DUM1 may be operated in response to a dummy selection signal DSW1.

The second dummy channel switch SW2_DUM1 may have one end connected to the input terminal of the common mode voltage Vref2 and the other end connected to a sixteenth node N916. The second dummy channel switch SW2_DUM1 may be operated in response to the dummy selection signal DSW1.

Although FIG. 9 shows that one end of the first dummy channel switch SW1_DUM1 and one end of the second dummy channel switch SW2_DUM1 are connected to the input terminal of the common mode voltage Vref2, some implementations are not limited thereto, and the first dummy channel switch SW1_DUM1 and the second dummy channel switch SW2_DUM1 may be connected to any input terminal for receiving the same voltage.

Each of the switches SW12 and SW22 may have one end connected to an input terminal of each of reference voltages REFB and REFT, and the other end connected to one end of each of the feedback capacitors Cf1 and Cf2. For example, the switch SW11 may control transfer of the reference voltage REFB to the fourth node N904 based on the active selection signal ASW1. The switch SW21 may control transfer of the reference voltage REFT to the sixteenth node N916 based on the active selection signal ASW1.

The holding/scaling circuit 9003 may perform the holding and scaling operations on the first input voltage VIP in the scaling and hold periods. For example, the holding/scaling circuit 9003 may turn on the switches SW11 and SW12 and turn off the switches SW12 and SW14.

As the switch SW12 is turned on, the amplifier 903*a* may act as the unity buffer, and the voltage at a seventh node N907 of the amplifier 903*a* may be intactly transferred to the output terminal. For example, as the seventh node N907, which is an input terminal of the amplifier 903*a*, and an eighth node N908, which is an output terminal, are connected to each other, the offset capacitor C01 may store the voltage output from the eighth node N908 of the amplifier 903*a*. Accordingly, the offset capacitor C01 may store the offset voltage that has the same magnitude as and the opposite sign to those of the offset voltage generated at the seventh node N907. Here, 1 may be a set amplification ratio of the amplifier 903*a*.

In addition, as the switch SW13 is turned off and the switch SW11 is turned on, the feedback capacitor Cf1 may be disconnected from the eighth node N908 of the amplifier 903*a* and connected to the reference voltage REFB. Accordingly, the feedback capacitor Cf1 may store the reference voltage REFB.

For example, the offset capacitor C01 may store the offset voltage that has the same magnitude as and the opposite sign to those of the offset voltage generated at the seventh node N907, that is, the input terminal (+) of the amplifier 903*a*.

The holding/scaling circuit 9003 may also perform the operation similar to the operation performed on the first input voltage VIP on the second input voltage VIN in the scaling and hold periods.

Next, the holding/scaling circuit 9003 may turn off the switches SW11, SW12, and SW14 and turn on the switch SW13 in the scaling and hold periods.

As the switch SW12 is turned off, the seventh node N907 and the eighth node N908 may be disconnected from each other, and the unity buffer function of the amplifier 903*a* may be released. For example, the amplifier 903*a* may amplify a signal applied to the seventh node N907 by a predetermined amplification ratio and then output the same.

As the switch SW11 is turned off and the switch SW13 is turned on, the feedback capacitor Cf1 may be disconnected from the reference voltage REFB. In addition, the feedback capacitor Cf1 may be connected to the sampling capacitor CSP1 to form the feedback loop.

The offset voltage stored in the offset capacitor C01 may have the same amount as and the opposite polarity to those of the offset voltage Vosl at the seventh node N907 of the amplifier 903*a*, and the offset voltage stored in the offset capacitor C01 and the offset voltage at the seventh node N507 may offset each other. For example, the amplifier 903*a* may amplify and output the signal without being affected by the offset voltage generated at the seventh node N907. In addition, the voltage charged in the sampling capacitor CSP1 may be transferred to the feedback capacitor Cf1. Accordingly, the first input voltage VIP1 may be output from the amplifier 903*a* by being amplified based on the ratio of the sampling capacitor CSP1 to the feedback capacitors Cf1.

The signal input to the amplifier 903*a* may be amplified by the amplification ratio of CSP1/Cf1, and may not be affected by the offset voltage. In addition, the ratio Cs/Cf of the sampling capacitor CSP1 or Cs2 to the feedback capacitor Cf1 or Cf2 may be predetermined.

Figure 10:
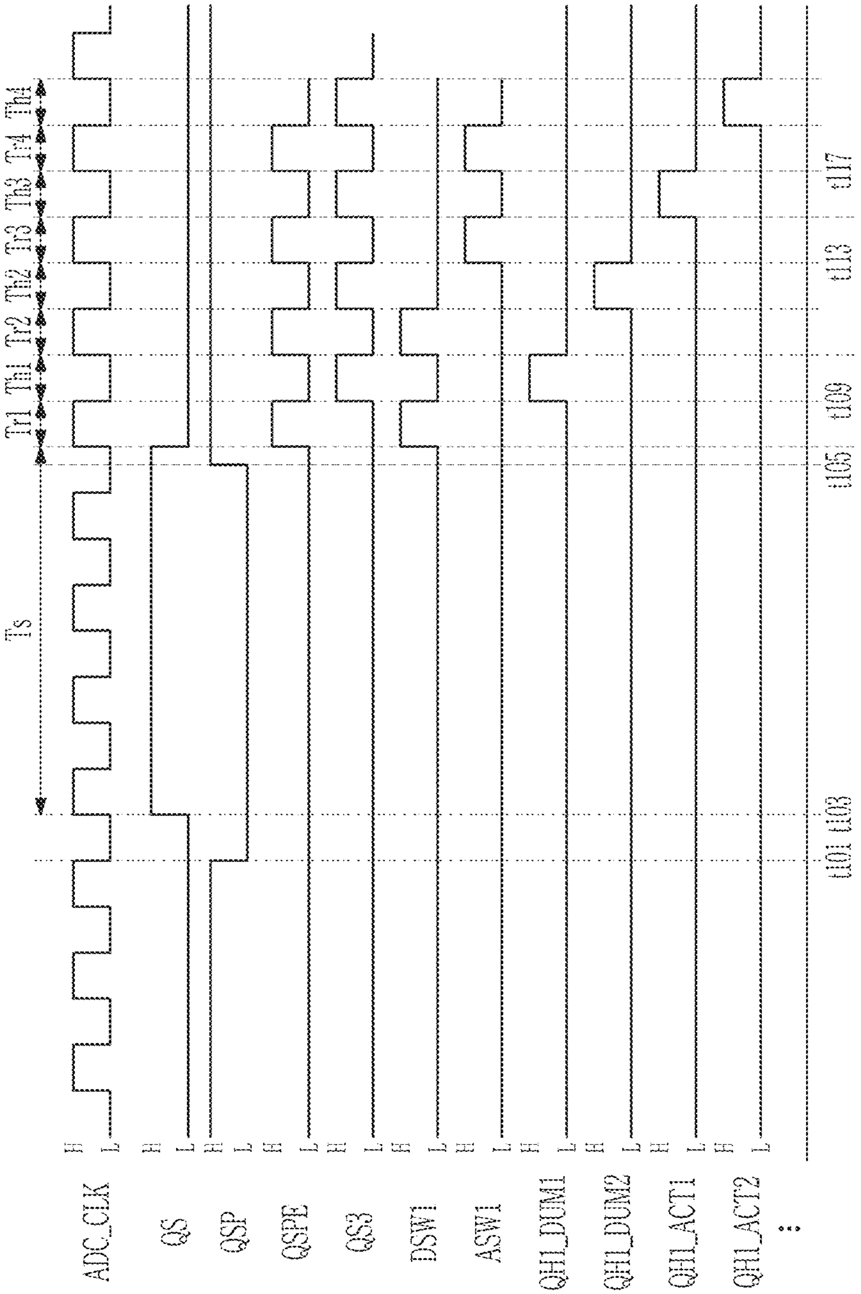
FIG. 10 is a timing diagram showing an example of a signal for controlling a switch in the analog front end of FIG. 9 according to some implementations.

The description describes a method of operating the AFE 900 shown in FIG. 9 with reference to FIG. 10 together.

FIG. 10 is a timing diagram showing an example of a signal for controlling a switch in the AFE of FIG. 9 according to some implementations. In FIG. 10 shows a clock signal ADC_CLK, the first sampling signal QS, the second sampling signal QSP, the third sampling signal QSPE, the switch control signal QS3, the dummy selection signal DSW1, the active selection signal ASW1, and a plurality of holding signals QH1_DUM1, QH1_DUM2, QH1_ACT1, and QH1_ACT2, which operates the ADC 3005 (of FIG. 3). The first sampling signal QS, the second sampling signal QSP, the third sampling signal QSPE, the switch control signal QS3, the dummy selection signal DSW1, the active selection signal ASW1, and the plurality of holding signals QH1_DUM1, QH1_DUM2, QH1_ACT1, and QH1_ACT2 may be generated based on the clock signal ADC_CLK.

In FIG. 10, the operation of the AFE 900 may be distinguished as those in a sample period Ts, a plurality of reset periods Tr1, Tr2, Tr3, and Tr4, and a plurality of hold periods Th1, Th2, Th3, and Th4. The plurality of reset periods Tr1, Tr2, Tr3, and Tr4 and the plurality of hold periods Th1, Th2, Th3, and Th4 may be performed alternately with each other. The sample period Ts may be a period for sampling each of the plurality of sensing signals for the plurality of channels. Each of the reset periods Tr1, Tr2, Tr3, and Tr4 may be a period for resetting a value stored in the holding/scaling circuit 9003 to accurately read a value sampled from the sensing signal. Each of the hold periods Th1, Th2, Th3, and Th4 may be a period for scaling and holding a value transferred from the sampling circuit 9001. The AFE 900 may measure each charge of the sensing signals stored in the sampling capacitors CSP1 and CSN1 respectively connected to the plurality of channels by alternately performing the reset periods Tr1, Tr2, Tr3, and Tr4 and the hold periods Th1, Th2, Th3, and Th4 for each of the plurality of channels.

For convenience of explanation, FIG. 10 assumes two dummy channels and two active channels. For example, a first dummy channel DUM1, a second dummy channel DUM2, a first active channel ACT1, and a second active channel ACT2 may be sequentially connected to the holding/scaling circuit 9003. The reset period Tr1 or Tr2 and the hold period Th1 or Th2 may be the reset period and the hold period for the dummy channel. In addition, the reset period Tr3 or Tr4 and the hold period Th3 or Th4 may be the reset period and the hold period for the active channel.

At a time point t101, the second sampling signal QSP may be shifted from a high level to a low level.

From the time point t101 to a time point t103, the first sampling signal QS, the third sampling signal QSPE, the switch control signal QS3, the dummy selection signal DSW1, the active selection signal ASW1, and the plurality of holding signals QH1_DUM1, QH1_DUM2, QH1_ACT1, and QH1_ACT2 may be at the low level.

At the time point t103, the first sampling signal QS be shifted to the high level.

Time points t103 to t105 may belong to the sample period Ts. During the sample period Ts, the charge may be stored in the sampling capacitor CSP1 or CSN1 by the sensing signal for each of the plurality of channels.

During the sample period Ts, the first sampling signal QS may be at the high level, the second sampling signal QSP, the third sampling signal QSPE, the switch control signal QS3, the dummy selection signal DSW1, the active selection signal ASW1, and the plurality of holding signals QH1_DUM1, QH1_DUM2, QH1_ACT1, and QH1_ACT2 may maintain the low level.

After the sample period Ts, the reset period and hold period may be alternately disposed.

During the plurality of reset periods Tr1, Tr2, Tr3, and Tr4 and the plurality of hold periods Th1, Th2, Th3, and Th4, the first sampling signal QS may maintain the low level, and the second sampling signal QSP may maintain the high level. In addition, in each of the plurality of hold periods Th1, Th2, Th3, and Th4, a hold signal corresponding to each channel may maintain the high level. For example, the hold signal QH1_DUM1 may be at the high level in the hold period Th1 for the first dummy channel DUM1, the hold signal QH1_DUM2 may be at the high level in the hold period Th2 for the second dummy channel DUM2, the hold signal QH1_ACT1 may be at the high level in the hold period Th3 for the first active channel ACT1, and the hold signal QH1_ACT2 may be at the high level in the hold period Th4 for the second active channel ACT2.

At a time point t107, the first sampling signal QS may be shifted from the high level to the low level, and the third sampling signal QSPE and the dummy selection signal DSW1 may be shifted from the low level to the high level.

Time points t107 to t109 may belong to the reset period Tr1 of the first dummy channel DUM1.

During the time points t107 to t109, the third sampling signal QSPE and the dummy selection signal DSW1 may be at the high level, and the switch control signal QS3 and the active selection signal ASW1 may be at the low level.

At the time point t109, the third sampling signal QSPE and the dummy selection signal DSW1 may be shifted from the high level to the low level. The switch control signal QS3 and the hold signal QH1_DUM1 corresponding to the first dummy channel DUM1 may be shifted from the low level to the high level.

Time points t109 to t111 may belong to the hold period Th1 of the first dummy channel DUM1.

During the time points t109 to t111, the third sampling signal QSPE, the dummy selection signal DSW1, and the active selection signal ASW1 may be at the low level. In addition, the switch control signal QS3 may be at the high level and the hold signal QH1_DUM1 may be at the high level.

From the time point t111 to a time point t113, the reset period Tr2 and the hold period Th2 for the second dummy channel DUM2 may be performed. The reset period Tr2 may be similar to the reset period Tr1, and the hold period Th2 may be similar to the hold period Th1.

At the time point t113, the third sampling signal QSPE and the active selection signal ASW1 may be shifted from the low level to the high level. The switch control signal QS3 may be shifted from the high level to the low level.

Time points t113 to t115 may belong to the reset period Tr3 of the first active channel ACT1.

During the time points t113 to t115, the third sampling signal QSPE, and the active selection signal ASW1 may be at the high level, and the switch control signal QS3 and the dummy selection signal DSW1 may be at the low level.

At the time point t115, the third sampling signal QSPE and the active selection signal ASW1 may be shifted from the high level to the low level. The switch control signal QS3 and the hold signal QH1_ACT1 corresponding to the first active channel ACT1 may be shifted from the low level to the high level.

Time points t115 to t117 may belong to the hold period Th3 of the first active channel ACT1.

During the time points t115 to t117, the third sampling signal QSPE, the dummy selection signal DSW1, and the active selection signal ASW1 may be at the low level, and the switch control signal QS3 and the hold signal QH1_ACT1 may be at the high level.

In summary, the dummy selection signal DSW1 may maintain the high level in the reset period of the dummy channel, and the common mode voltage Vref2, which is the same voltage, may thus be input to the node N904 and the node N916.

In the hold periods Th1 and Th2 for the dummy channel, Equation 2 described above may be expressed as Equation 3.

[Equation 3]

$$V_{op} - V_{on} = \frac{C_s}{C_f}(VIP - VIN) - (REFT - REFB) = \frac{1}{2}(0\ \text{V}) - (0\ \text{V}) = 0\ \text{V}$$

In addition, the active selection signal ASW1 may maintain the high level in the reset period of the active channel. Accordingly, the reference voltage REFB may be input to the node N904 and the reference voltage REFT may be input to the node N916. In the hold periods Th3 and Th4 for the active channel, Equation 2 described above may be expressed as Equation 4.

The first input voltage VIP may be the same as the second input voltage VIN or may have the value larger than the second input voltage VIN by the first value, as described above. For example, the first value may range from zero V to 4 V. It may be set that Cf1=2CSP1 and 1 V is the difference between the first reference voltage REFT and the second reference voltage REFB.

[Equation 4]

$$V_{op} - V_{on} = \frac{C_s}{C_f}(VIP - VIN) - (REFT - REFB) = \frac{1}{2}(0\sim 4\ \text{V}) - (1\ \text{V}) = -1\ \text{V}\sim 1\ \text{V}$$

As shown in Equation 4, the output value (that is, the first output voltage Vop—the second output voltage Von) for the first input voltage VIP and second input voltage VIN may be −1 V when the first value is zero, and may be 1 V when the first value is 4 V. These values may fall within the range where the input range of the ADC may be used to its maximum potential.

As a result, when sensing the dummy channel, both the first output voltage Vop and the second output voltage Von may have a value of zero V. Accordingly, the sensing block 303 (of FIG. 1) may generate data corresponding to a middle gray (here, the operation range of the ADC may be −1 to 1). Accordingly, the output voltage may not be outside the operation range of the ADC by sensing the dummy channel, and may not affect even a later case of sensing the output of the active channel.

Figure 11:
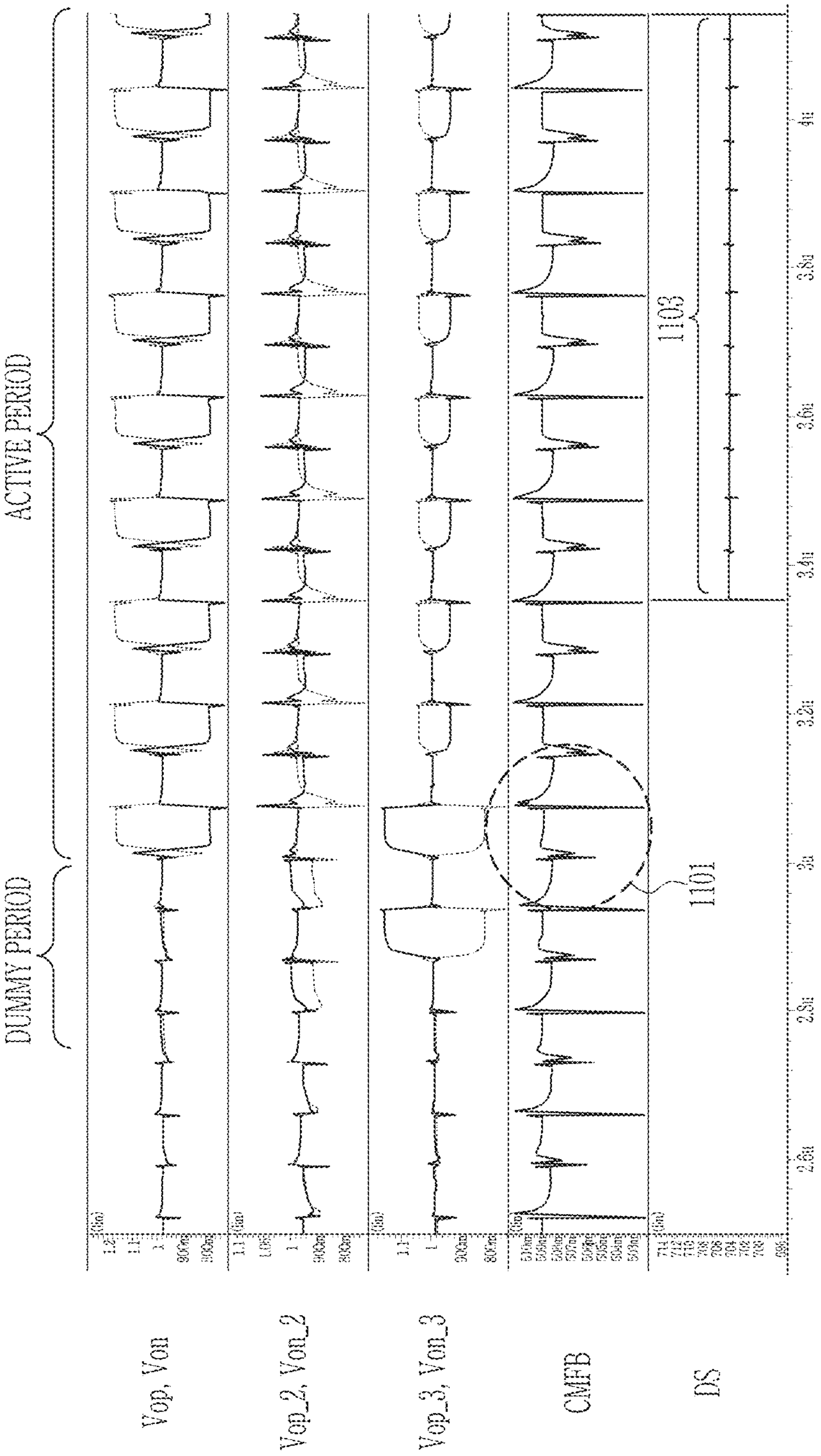
FIG. 11 is a graph showing an output of each of a plurality of ADCs in an example of a display system that includes the analog front end of FIG. 9 according to some implementations.

FIG. 11 is a graph showing an output of each of the plurality of ADCs in an example of a display system that includes the analog front end of FIG. 9 according to some implementation. FIG. 11 assumes the case where each of the plurality of ADCs generates the 10-bit data sensing signal DS.

In FIG. 11, the first output voltages Vop and Vop_3, the second output voltages Von_2 and Von_3, the CMFB voltage, and the data sensing signal DS, are output while passing through the first output voltage Vop, the second output voltage Von, and the plurality of stages of the plurality of ADCs 3005 (of FIG. 3).

In some implementations, the first input voltage VIP may be the same as the second input voltage VIN or may have the value larger than the second input voltage VIN by the first value. For example, the first value may be 4 V. For example, the sampling circuit 9001 and the holding/scaling circuit 9003 may perform the voltage scaling to process the voltage difference of 4 V by using the plurality of ADCs 3005 (of FIG. 3). For example, it may be set that Cf1=2Cs and 1 V is the difference between the first reference voltage REFT and the second reference voltage REFB. For example, the output value (that is, the first output voltage Vop—the second output voltage Von) for the first input voltage VIP and the second input voltage VIN may range from −1 V to 1 V. These values may fall within the range where the input range of the ADC may be used to its maximum potential.

The sensing block 303 (in FIG. 1) may generate the data corresponding to the gray of zero. The active period for sensing the output of the active channel may be performed after the dummy period. As described above, the input voltages VIP and VIN may be amplified through the amplifier 903*a* and the plurality of ADCs 3005 (of FIG. 3). Accordingly, the first output voltage Vop_3 and the second output voltage Von_3 may be saturated, thus changing the CMFB voltage of the amplifier (AMP) in the ADC 3005*b* of the second stage (or stage #2). However, the same common mode voltage Vref2 may be input to the input of the AMP in the hold period for the dummy channel, thus not changing the voltage input to the AMP through the CMFB in the ADC 3005*b* of the second stage (or stage #2) as shown in a first portion 1101 of FIG. 11. Accordingly, any code error may not occur due to a source output measurement of the dummy channel, and the dummy channel sensing may not affect the output value of the active channel. Additionally, the display driving circuit including a source block having the AFE 900 may sense the channel data without any error, and accurately correct the image data based thereon.

Figure 12:
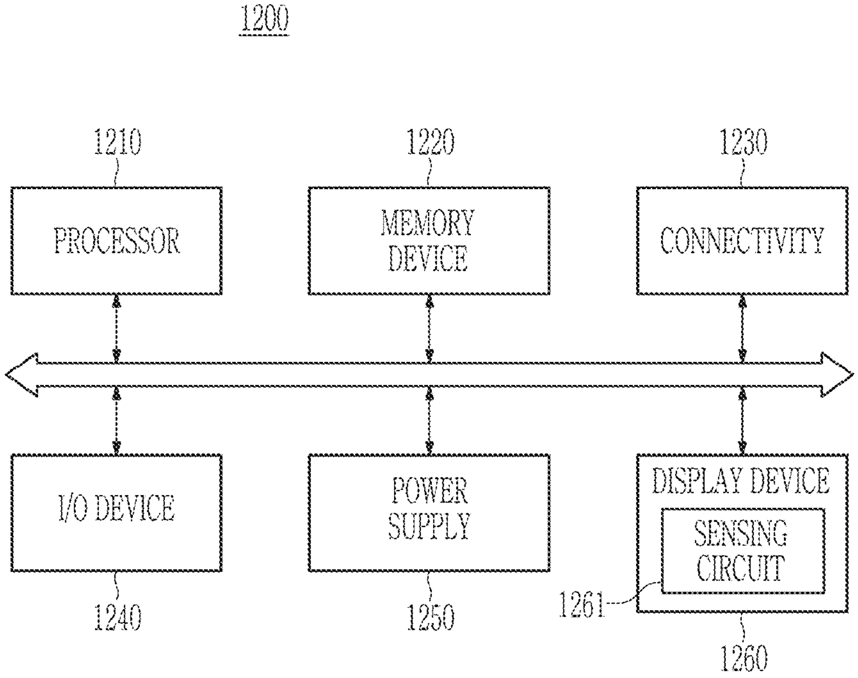
FIG. 12 is a block diagram showing an example of an electronic system according to some implementations.

FIG. 12 is a block diagram showing an example of an electronic system according to some implementations. In FIG. 12, an electronic system 1200 may include a processor 1210, a memory device 1220, a connectivity 1230, an input/output device 1240, a power supply 1250, and a display device 1260. The electronic system 1200 may further include several ports that may communicate with a video card, a sound card, a memory card, a universal serial bus (USB) device, and the like or with other systems.

The processor 1210 may control an overall operation of the electronic system 1200 and execute an operating system, an application, or the like. The memory device 1220 may store data necessary for operating the electronic system 1200. The connectivity 1230 may perform communication with an external device. The input/output device 1240 may include input means such as a keyboard, a keypad, a touchpad, a touch screen, a mouse, and a remote controller, or the like, and output means such as a speaker or a printer. The power supply 1250 may supply power necessary for operating the electronic system 1200. The display device 1260 may include a display panel and a display driving integrated circuit, and may be the display device according to some implementations.

The display driving integrated circuit may be the display driving integrated circuit according to some implementations. The display device 1260 may include a sensing circuit 1261 for detecting a feature of the plurality of pixels. The sensing circuit 1261 may include the sampling circuit connected to the plurality of channels in the display panel, the holding/scaling circuit connected to the sampling circuit, and the plurality of ADCs connected to the holding/scaling circuit to thus generate the data signal. The display device 1260 may compensate for the data on the image displayed on the display panel based on the data signal. The sensing circuit 1261 may control the plurality of switches in the sampling circuit, and perform the control for the input voltage received from the channel and the reference voltage functioning as a reference to have the same value when the sampling circuit is connected to the dummy channel. In addition, the sensing circuit 1261 may control the holding/scaling circuit for the same voltage to be input to the input terminal of the amplifier in the holding/scaling circuit when the sampled signal is transferred from the sampling circuit connected to the dummy channel. For example, the amplifier may be operated in the differential manner. Accordingly, the voltage of zero V may be input to the plurality of ADCs, and this value may be a value that is not outside the operation range of each of the plurality of ADCs.

While this disclosure contains many specific implementation details, these should not be construed as limitations on the scope of what may be claimed. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a combination can in some cases be excised from the combination, and the combination may be directed to a subcombination or variation of a subcombination.

What is claimed is:

1. A display device comprising:

a plurality of channels, the plurality of channels include at least one dummy channel;

a plurality of first sampling circuits, each configured to sample one of a plurality of dummy voltages corresponding to each of the at least one dummy channel, each dummy voltage of the plurality of dummy voltages comprises a respective floating dummy voltage different from a pixel voltage; and a holding/scaling circuit including a first input node, a second input node, a first output node, a second output node, a first feedback capacitor connected between the first input node and the first output node, and a second feedback capacitor connected between the second input node and the second output node, wherein the holding/scaling circuit is configured to:

store voltages of substantially a same magnitude in the first feedback capacitor and the second feedback capacitor, receive the plurality of sampled dummy voltages from the first input node and the second input node, and output a plurality of dummy output voltages acquired by amplifying the plurality of sampled dummy voltages to the first output node and the second output node.

2. The device of claim 1, wherein the plurality of channels include at least one active channel, wherein the device further comprises a plurality of second sampling circuits, each configured to sample an active voltage corresponding to the at least one active channel, wherein the first feedback capacitor and the second feedback capacitor are configured to store voltages of different magnitudes, and wherein the holding/scaling circuit is configured to receive the sampled active voltages from the first input node and the second input node, and output a plurality of active output voltages acquired by amplifying the sampled active voltages to the first output node and the second output node.

3. The device of claim 2, wherein the holding/scaling circuit includes:

a differential amplifier including a first input terminal, a second input terminal, a first output terminal connected to the first output node, and a second output terminal connected to the second output node;

a plurality of offset capacitors respectively connected to the first input terminal and the second input terminal, and configured to store offset voltages of the first input terminal and the second input terminal;

a first switch having a first end connected to the first output node and a second end connected to the first feedback capacitor; and a second switch having a first end connected to the second output node and a second end connected to the second feedback capacitor.

4. The device of claim 3, wherein the holding/scaling circuit further includes:

a third switch having a first end connected to the second end of the first switch and a second end connected to an input terminal that is configured to receive a predetermined first voltage; and a fourth switch having a first end connected to the second end of the second switch and a second end connected to the input terminal that is configured to receive the predetermined first voltage.

5. The device of claim 4, wherein the holding/scaling circuit further includes:

a fifth switch having a first end connected to the second end of the first switch and a second end connected to an input terminal that is configured to receive a first reference voltage;

a sixth switch having a first end connected to the second end of the second switch and a second end connected to an input terminal that is configured to receive a second reference voltage different from the first reference voltage;

a seventh switch connected between the first input terminal of the differential amplifier and first output terminal of the differential amplifier; and an eighth switch connected between the second input terminal of the differential amplifier and second output terminal of the differential amplifier.

6. The device of claim 5, wherein, while the first sampling circuit samples the plurality of dummy voltages, the third switch, the fourth switch, the seventh switch, and the eighth switch are turned on, and the first switch and the second switch are turned off.

7. The device of claim 5, wherein, while the holding/scaling circuit outputs the plurality of dummy output voltages to the first output node and the second output node, the first switch and the second switch are turned on, and the third switch, the fourth switch, the fifth switch, the sixth switch, the seventh switch, and the eighth switch are turned off.

8. The device of claim 2, wherein each of the plurality of first sampling circuits and the plurality of second sampling circuits includes:

a plurality of sampling capacitors connected to a first channel among the plurality of channels, each of the plurality of sampling capacitors being configured to sample a plurality of first active voltages or a plurality of first dummy voltages;

a plurality of sampling switches disposed between the plurality of channels and the plurality of sampling capacitors, each of the plurality of sampling switches being configured to operate based on an inverted channel selection signal; and a differential switch connected between the plurality of sampling switches and the plurality of sampling capacitors, the differential switch being configured to operate based on a channel selection signal.

9. The device of claim 8, wherein, during a sample period for the plurality of dummy voltages and the plurality of active voltages, the plurality of sampling switches are turned on, and a corresponding dummy voltage among the plurality of dummy voltages and a corresponding active voltage among the plurality of active voltages are respectively stored in the plurality of sampling capacitors.

10. The device of claim 9, wherein each of the plurality of first sampling circuits and the plurality of second sampling circuits further includes:

a plurality of holding switches disposed between the plurality of sampling capacitors and the first input node, disposed between the plurality of sampling capacitors and the second input node, and configured to operate in response to a corresponding holding signal among a plurality of holding signals.

11. The device of claim 10, wherein each of the plurality of first sampling circuits and the plurality of second sampling circuits are configured to:

simultaneously sample the plurality of dummy voltages and the plurality of active voltages based on the channel selection signal, and sequentially activate the plurality of holding signals after the sample period and sequentially transfer the plurality of sampled dummy voltages and the plurality of sampled first active voltages to the holding/scaling circuit.

12. The device of claim 1, further comprising:

a display panel including a plurality of pixels connected to the plurality of channels;

a pipeline analog to digital converter (ADC) configured to receive the plurality of dummy output voltages and a plurality of active output voltages from the holding/scaling circuit and generate a data sensing signal indicating electrical features of the plurality of pixels; and a timing controller configured to receive image data and compensate for the image data based on the data sensing signal.

13. A display device comprising:

a first input node and a second input node;

a first output node and a second output node;

a first feedback capacitor connected between the first input node and the first output node;

a second feedback capacitor connected between the second input node and the second output node;

a differential amplifier including a first input terminal, a second input terminal, a first output terminal connected to the first output node, and a second output terminal connected to the second output node;

a plurality of offset capacitors respectively connected to the first input terminal and the second input terminal, and configured to store offset voltages of the first input terminal and the second input terminal;

a first switch having a first end connected to the first output node and a second end connected to the first feedback capacitor;

a second switch having one end connected to the second output node and the other end connected to the second feedback capacitor;

a third switch having one end connected to the second end of the first switch and a second end connected to an input terminal that is configured to receive a predetermined first voltage;

a fourth switch having a first end connected to the second end of the second switch and a second end connected to the input terminal that is configured to receive the predetermined first voltage;

a fifth switch having a first end connected to the second end of the first switch and a second end connected to an input terminal that is configured to receive a first reference voltage; and a sixth switch having a first end connected to the second end of the second switch and a second end connected to an input terminal that is configured to receive a second reference voltage that is different from the first reference voltage.

14. The device of claim 13, further comprising:

a seventh switch connected between the first input terminal of the differential amplifier and first output terminal of the differential amplifier; and an eighth switch connected between the second input terminal of the differential amplifier and second output terminal of the differential amplifier.

15. The device of claim 14, further comprising:

a plurality of channels, the plurality of channels includes at least one dummy channel and at least one active channel;

a plurality of first sampling circuits, each configured to sample each of a plurality of dummy voltages corresponding to each of the at least one dummy channel;

a plurality of second sampling circuits, each configured to sample a plurality of active voltages corresponding to each of the at least one active channel; and a holding/scaling circuit configured to receive the plurality of sampled dummy voltages or the plurality of sampled active voltages from the first input node and the second input node.

16. The device of claim 15, wherein, while the first sampling circuit samples the plurality of dummy voltages, the third switch, the fourth switch, the seventh switch, and the eighth switch are turned on, and the first switch and the second switch are turned off.

17. The device of claim 15, wherein, while the holding/scaling circuit outputs a plurality of dummy output voltages to the first output node and the second output node, the first switch and the second switch are turned on, and the third switch, the fourth switch, the fifth switch, the sixth switch, the seventh switch, and the eighth switch are turned off.

18. A display system comprising:

a display panel including a plurality of gate lines, a plurality of data lines, a plurality of sensing lines including at least one dummy channel, and a plurality of pixels;

a host processor configured to generate image data for display on the display panel and transmit the image data to a timing controller;

a data driver including a first input node, a second input node, a first output node, a second output node, a first feedback capacitor connected between the first input node and the first output node, and a second feedback capacitor connected between the second input node and the second output node, wherein the data driver is configured to:

store voltages of substantially a same magnitude in the first feedback capacitor and the second feedback capacitor, sample each of a plurality of dummy voltages corresponding to the at least one dummy channel, each dummy voltage of the plurality of dummy voltages comprises a respective floating dummy voltage different from a pixel voltage, receive the plurality of sampled dummy voltages from the first input node and the second input node, output a plurality of dummy output voltages acquired by amplifying the plurality of sampled dummy voltages to the first output node and the second output node, and receive the plurality of dummy output voltages and a plurality of active output voltages to generate a data sensing signal indicating electrical features of the plurality of pixels; and wherein the timing controller is configured to receive image data, compensate for the image data based on the data sensing signal, and generate the compensated image data.

19. The system of claim 18, wherein the plurality of sensing lines further include at least one active channel, wherein the first feedback capacitor and the second feedback capacitor are configured to store voltages of different magnitudes, and wherein a plurality of active voltages corresponding to the at least one active channel is sampled, the plurality of sampled active voltages are received from the first input node and the second input node, and the plurality of active output voltages acquired by amplifying the plurality of sampled active voltages are output to the first output node and the second output node.

20. The system of claim 19, wherein the data driver further includes:

a differential amplifier including a first input terminal, a second input terminal, a first output terminal connected to the first output node, and a second output terminal connected to the second output node;

a plurality of offset capacitors respectively connected to the first input terminal and the second input terminal, and configured to store offset voltages of the first input terminal and the second input terminal;

a first switch having a first end connected to the first output node and a second end connected to the first feedback capacitor; and a second switch having a first end connected to the second output node and a second end connected to the second feedback capacitor.

* * * * *